(12) United States Patent
Kurachi et al.

(10) Patent No.: US 7,467,895 B2
(45) Date of Patent: Dec. 23, 2008

(54) SEPARATOR AND LINEAR GUIDE APPARATUS

(75) Inventors: Nobuhide Kurachi, Kanagawa (JP); Masaru Akiyama, Kanagawa (JP); Soichiro Kato, Kanagawa (JP); Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 326 days.

(21) Appl. No.: 11/352,224

(22) Filed: Feb. 13, 2006

(65) Prior Publication Data

US 2006/0262999 A1  Nov. 23, 2006

(30) Foreign Application Priority Data

Feb. 14, 2005 (JP) .......................... P.2005-036443

(51) Int. Cl.
*F16C 29/06* (2006.01)
(52) U.S. Cl. ............................... 384/51; 384/45; 384/43
(58) Field of Classification Search ............ 384/43–45, 384/51, 537, 542, 569, 574; 310/89–90
See application file for complete search history.

(56) References Cited

U.S. PATENT DOCUMENTS

| | | | | | |
|---|---|---|---|---|---|
| 3,219,398 | A | * | 11/1965 | Anderson | 384/44 |
| 3,552,814 | A | * | 1/1971 | Alston et al. | 384/574 |
| 3,704,919 | A | * | 12/1972 | Titt | 384/44 |
| 3,920,289 | A | * | 11/1975 | Demay | 384/44 |
| 3,937,532 | A | * | 2/1976 | Fuhrmann et al. | 384/44 |
| 3,964,802 | A | * | 6/1976 | Pitner | 384/44 |
| 5,927,858 | A | * | 7/1999 | Agari | 384/45 |
| 6,102,572 | A | * | 8/2000 | Hidano | 384/45 |
| 6,513,987 | B2 | * | 2/2003 | Takahashi et al. | 384/574 |
| 2004/0213485 | A1 | * | 10/2004 | Kato et al. | 384/45 |
| 2005/0018933 | A1 | * | 1/2005 | Ishihara | 384/44 |

FOREIGN PATENT DOCUMENTS

| | | | |
|---|---|---|---|
| JP | 10-110728 A | | 4/1998 |
| JP | 10-281154 A | | 10/1998 |
| JP | 2001-132745 A | | 5/2001 |
| JP | 2003-269463 A | | 9/2003 |
| JP | 2003269463 A | * | 9/2003 |
| JP | 2004205029 A | * | 7/2004 |
| JP | 2004-245233 A | | 9/2004 |

(Continued)

OTHER PUBLICATIONS

Japanese Office Action dated Feb. 27, 2008.

*Primary Examiner*—Marcus Charles
(74) *Attorney, Agent, or Firm*—Sughrue Mion, PLLC

(57) ABSTRACT

A separator for use in a linear guide apparatus including a guide rail, a slider, and a plurality of rollers which circulate along an endless circulation passage provided in the guide rail and the slider and having guide grooves. The separator includes a separator body interposed between the rollers and having a pair of roller contact surfaces respectively opposing outer peripheral surfaces of the adjacent rollers, and a pair of arm portions which are guided by the guide grooves. A surface of each of the arm portions opposing the guide groove is formed such that an opposition distance with respect to the guide groove becomes wider from a fixed end side of the arm portion toward a free end thereof.

11 Claims, 23 Drawing Sheets

FOREIGN PATENT DOCUMENTS

| | | | | |
|---|---|---|---|---|
| JP | 2004286156 | A | * | 10/2004 |
| JP | 2004316818 | A | * | 11/2004 |
| JP | 2004332769 | A | * | 11/2004 |
| JP | 2005030488 | A | * | 2/2005 |
| JP | 2005036831 | A | * | 2/2005 |

* cited by examiner

CIRCULATION DIRECTION

SEPARATOR AND LINEAR GUIDE APPARATUS

BACKGROUND OF THE INVENTION

1. Field of the Invention

The present invention relates to a separator interposed between adjacent ones of rolling elements (e.g., rollers) of a linear guide apparatus, as well as a linear guide apparatus.

2. Description of the Background Art

In a linear guide apparatus, a slider relatively moves with respect to a guide rail while pluralities of rolling elements roll in endless circulation passages. If the slider relatively moves with respect to the guide rail, the rolling elements roll in the same direction, so that adjacent ones of the rolling elements rub against each other. For this reason, there are problems in that a smooth rolling of the rolling elements is hampered, a wear of the rolling elements progresses fast, and noise increases. Accordingly, in order to operate the linear guide apparatus by allowing the rolling elements smoothly, by preventing early wear of the rolling elements, and by suppressing the generation of noise, a linear guide apparatus is known in which a separator (retaining piece) is interposed between adjacent ones of the rolling elements (e.g., rollers).

For example, in a technique disclosed in Japanese Patent Unexamined Publication No. JP-A-10-110728, a linear guide apparatus is proposed in which the separators are connected together by a flexible belt-shaped connector (hereafter referred to as the "belt-shaped arm portion").

However, with the separators connected together by the belt-shaped arm portion, the belt-shaped arm portion is repeatedly bent when the belt-shaped arm portion transfers from a linear motion area to a direction changing passage area of the endless circulation passage. At this time, a relatively large force acts in the thus bended portion of the belt-shaped arm portion in the direction changing passage area. For this reason, if this bending is repeated, there is a risk of the belt-shaped arm portion fracturing due to the fatigue of the material. Further, there is a possibility that an operational malfunction such as a locking of the circulating rollers can occur depending on thus fractured position of the belt-shaped arm portion. In addition, in a case where the fracture of the belt-shaped arm portion has occurred, after all the rollers in the endless circulation passage are temporarily pulled out, and the belt-shaped arm portion where the fracture occurred is removed, and then, a need arises to build in all the rollers again. For this reason, it cannot necessarily be said that the construction of the separators as a unit is good when taking into account of performing maintenance.

Accordingly, it has been conceived to interpose an independent separator 150 between adjacent ones of rollers 46, as shown in FIG. 12. This separator 150 has a pair of arm portions 152 for retaining the adjacent rollers 46 in a predetermined attitude. The separators 150 are incorporated in an endless circulation passage 28 alternately with the rollers 46, such that each of their arm portions 152 is retained (guided) in a guide groove 38 formed by a retainer 40 and the like. Hence, the separators 150 are capable of lessening the axial waggling (skew) and competitive rolling of the rollers 46, thereby making it possible to stably circulate the rollers 46.

If such a construction is adopted, a large cumulative force is practically not applied to the arm portions 152 of the separators 150 during the circulation in the endless circulation passage 28. For this reason, the possibility of occurrence of the operational malfunction such as the locking of the circulating rollers becomes small.

The separators 150 having the above-described construction are incorporated in the endless circulation passage 28 independently as individual parts. At this time, there are cases where the rollers 46 and the separators 150 are inserted into the endless circulation passage 28 from outside the retainer 40. In this case, as shown in FIG. 13, the separator 150 (the separator shown in the center of the drawing) is set horizontally and is inserted in the direction in which the retainer 40 continues. Subsequently, the separator 150 is rotated and is set in a perpendicular direction (predetermined position). It should be noted that in FIG. 13, an image in which the separator 150 is set horizontally and is inserted, and the separator 150 is subsequently rotated and is set in the perpendicular direction (predetermined position) is shown by solid arrows.

Thus, if the respective separators 150 are incorporated in the endless circulation passage 28 independently as individual parts, even if some operational malfunction occurs to anyone of the rollers 46 and the separators 150, for instance, they can be individually replaced. Accordingly, in performing the maintenance, for example, only the separator 150 or the roller 46 in which the malfunction has occurred can be replaced by inserting replacement parts individually into the guide grooves 38 formed by the retainer 40 and the like. As a result, as compared with the separators connected by belt-shaped arm portions, for example, it is possible to perform maintenance such as the parts replacement in less time and trouble.

Here, in the above-described separator, which has the pair of arm portions for holding the rollers in a predetermined posture and is incorporated in the endless circulation passage independently as an individual part, each of the arm portions should preferably extend to a vicinity of the center of each of the adjacent rollers, in order to prevent the axial waggling (skew) of the rollers and stabilize the posture of the rollers. In addition, the shape of the arm portion should preferably be such that the separator itself is capable of alleviating the frictional force at the time of circulation in the endless circulation passage and of improving the operability.

However, in a case where each arm portion of the separator is merely formed by being extended to the vicinity of the center of each adjacent roller, there are cases where, depending on the shape of the arm portion, particularly a distal end (free end) of the arm portion interferes with the retainer and the guide groove formed by the retainer and the like, as shown in FIG. 13. In FIG. 13, it should be noted that an image in which the arm portions of the separator interfere with the guide grooves are shown by hollow arrows.

Here, the term "interference" referred to herein means interaction occurring at a point where two or more members come into contact with each other at an identical point.

If the degree of interference of the distal end (free end) of the arm portion with the retainer and the guide groove formed by the retainer and the like is strong, there is a possibility that damage such as the bending of the arm portion can occur. For this reason, an assembly operator must perform the assembly operation while paying attention so that damage and the like do not occur in the arm portions of the separators. Accordingly, there is a problem in that the operational efficiency declines, and the assembling cost becomes high. In addition, also when the separators circulate in the endless circulation passage, if the arm portion of the separator and the wall of the guide groove interfere strongly, the sliding resistance during circulation becomes large, so that there is a problem in that smooth circulation is impaired.

In addition, in a conventional linear guide apparatus, a connecting passage is formed by a return passage provided in a slider body of a saddle-like slider and a direction changing passage provided in an end cap. A load passage is formed by causing the pair of rail raceway surfaces provided on a side surface of a guide rail and a pair of slider raceway surfaces provided on the slider body of the slider to oppose each other. Each separator is interposed between adjacent ones of the rollers, which circulate while rolling in a circulation passage formed by the connecting passage and the load passage. A pair of roller retaining holes for respectively retaining the rollers are respectively provided in front and rear sides in a circulation direction of the separator. Collar portions which come into surface contact with side surfaces of the rollers are alternately provided on side portions of the front and rear roller retaining holes, such that one side surface of one roller is brought into surface contact with the collar portion, while the axial movement of the other side surface is restricted by the wall surface of the circulation passage, to thereby prevent the contact between the rollers (e.g., Japanese Patent Unexamined Publication No. JP-A-2001-132745 (pp. 4 to 6, FIG. 5)).

Generally, the rollers, which roll along the circulation passage of the linear guide apparatus using rollers, circulate while rolling on the raceway surface in the load passage by substantially pure rolling motion.

In this case, if a skew in which the roller moves obliquely with its axis inclined obliquely without being perpendicular to the circulation direction occurs in the load passage (the angle of inclination from the perpendicular direction at this time is referred to as the skew angle), slippage occurs between the roller and the raceway surface, with the result that the movement resistance when the slider moves linearly on the guide rail increases due to the sliding frictional force. At the same time, wear is likely to occur at the rolling surfaces of the rollers and the raceway surfaces of the guide rail and the slider, which can cause a decline in life time of the linear guide apparatus.

However, with the above-described conventional technique, one side surface of the roller is brought into surface contact with each of the collars, which are provided alternately in the retaining holes of the separators, while the other side surface is restricted by the wall surface of the circulation passage to retain the rollers by the separators. Therefore, when the skew has occurred in the roller, and a corner of the other side surface of the roller has abutted against the wall surface of the circulation passage, a corner of one side surface abuts against the collar portion of the separator to move the separator in the axial direction, unfavorably causing the side surface of the other roller fitted in the same separator to be pressed against the wall surface of the circulation passage. Hence, there is a problem in that the movement resistance of the slider when the skew has occurred is increased as the frictional force between the side surface of the roller and the wall surface is added to the sliding frictional force caused by the skew.

Furthermore, with another conventional linear guide apparatus, the connecting passage is formed by the return passage provided in the slider body of the saddle-like slider and the direction changing passage provided in the end cap. The load passage is formed by causing the pair of rail raceway surfaces provided on a side surface of the guide rail and the pair of slider raceway surfaces provided on the slider body of the slider to oppose each other. The rollers are charged in the circulation passage formed by the connecting passage and the load passage, and are circulated while rolling. A pair of roller contact surfaces for respectively retaining the rollers with an adjoining portion interposed therebetween are respectively provided on front and rear sides of the separator in the circulation direction of the rollers, and a number of kinds of separators are set unequally by slightly varying the thickness of the adjoining portion. These separators are each interposed between adjacent ones of the rollers, and the rollers arranged at unequal pitches (e.g., Japanese Patent Unexamined Publication JP-A-10-281154 (mainly pp. 5 to 6, FIG. 1)).

Generally, in a case where the rollers with each separator interposed therebetween are charged in the circulation passage of the linear guide apparatus, since the separators and the rollers are separated parts, clearances are formed. If the circulation direction clearance (which refers to the clearance in the circulation direction which is formed by sequentially arranging all the rollers in the circulation passage via the separators and making them adjacent to each other) is excessively large, the separators can fall or, the posture of the separators becomes inclined, causing the separators to come into contact with the circulation passage, thereby hampering the smooth movement of the slider.

In addition, if the circulation direction clearance is excessively small, the contact pressure between the separator and the roller becomes locally high, which produces variations in the moving force during the movement of the slider.

Accordingly, a management of the circulation direction clearance to make in an appropriate range is important in achieving smooth the movement of the slider of the linear guide apparatus.

However, with the above-described conventional techniques, since a number of kinds of the separators are each interposed between the rollers in a state that the thickness of the adjoining portion is slightly varied are combined, if an attempt is made to properly set the circulation direction clearance when the circulation direction clearance is was improper or the combination was mistaken, it is difficult to visually identify the thickness of the adjoining portion of the interposed separator. Therefore, it is necessary to remove all the separators and the rollers from the circulation passage and then to charge them again, so that there is a problem in that time is required in the assembly of the linear guide apparatus.

In addition, since the visual identification of the separators is difficult, there is a problem in that in the inspection operation, it is difficult to conduct inspection as to which separators are combined, i.e., whether proper separators have been charged.

SUMMARY OF THE INVENTION

The invention has been devised in view of the above-described problems, its object is to provide a separator and a linear guide apparatus which makes it possible to alleviate the interference occurring between the guide groove and the arm portion of separator when the separators and the rollers are inserted from outside the retainer and are arranged in the endless circulation passage, so as to prevent damage such as the bending of the arm portion, and which makes it possible to lower the sliding resistance during circulation so as to improve the operability.

Another object of the invention is to provide means for preventing an increase in the movement resistance of the slider even in the linear guide apparatus in which the separators are each interposed between the rollers.

Furthermore, the invention has been devised to overcome the above-described problems, and still another object of the invention is to provide means for facilitating the identification of the separators to attain efficiency in the assembly operation and the inspection operation.

To overcome the above-described problems, in accordance with the invention there is provided a separator for a linear guide apparatus comprising a guide rail, a slider, and a plurality of rollers which circulate while rolling in an endless circulation passage provided in the guide rail and the slider and having guide grooves extending in an arrangement direction of the rollers, the separator comprising:

a separator body interposed between adjacent ones of the rollers and comprising a pair of roller contact surfaces which respectively opposes to each other and contacts with an outer peripheral surface of the adjacent roller; and a pair of arm portions each jutting out from each ends of the separator body toward a direction of each of the adjacent rollers along with an end face of the adjacent roller, the pair of arm portions being guided by the guide grooves, wherein a surface of each of the arm portions opposing the guide groove of the endless circulation passage is formed such that an opposition distance with respect to the guide groove becomes wider from a fixed end side of the arm portion toward a free end thereof.

According to the construction of the invention, the surface of each arm portion opposing the guide groove is formed on the arm portion of the separator such that the opposing distance, which is a distance from the surface of the arm portion to the guide groove, becomes wider toward its free end. For this reason, when the separator is inserted into the guide groove from outside the retainer, the separator is inserted while being guided in conformity to this surface. Namely, the separator can be inserted smoothly into the guide groove. Therefore, it is possible to alleviate damage such as the bending of the arm portion of the separator. As a result, an assembly operator is able to alleviate his or her attention to be paid to the assembling operation. Accordingly, the operational efficiency improves, so that the assembling cost can be lowered. In addition, it is possible to provide a separator which makes it possible to alleviate the frictional force of the separator itself during circulation in the endless circulation passage, and which makes it possible to improve the operability of the linear guide apparatus.

Further, in the separator, it is preferable that a maximum dimension of the separator in a projected shape in a direction normal to a plane including axes of the adjacent rollers is not more than the width of the guide groove.

In addition, it is preferable that the maximum dimension in the projected shape of the separator is a maximum width of the separator in a widthwise direction of the guide groove.

Here, the phrase "projected shape" means a figure in which when a position and a shape of an object in a space is viewed from a point at infinity, straight lines connecting an observer's eye and points on the object are caused to meet on a plane to depict the figure.

According to the separator of the invention, the separator can be easily rotated in the guide groove by setting a center of figure of the projected shape and a normal line to a plane including the axes of the adjacent rollers as its rotational axis. For this reason, the separator can be inserted into the guide groove formed by the retainer and the like from outside the retainer with practically no interference. Therefore, it is possible to prevent damage such as the bending of the arm portion of the separator. As a result, the assembly operator is able to further alleviate his or her attention to be paid to the assembling operation. Hence, the operating efficiency improves further, making it possible to further reduce the assembling cost.

It is preferable that on at least one of two opposing surfaces of the pair of arm portions of the separator, a guide surface, in which a distance between the two opposing surfaces becomes larger from the fixed end side of the arm portion toward the free end thereof, is formed.

According to the separator of the invention, since guide surfaces for broadening the width between two opposing surfaces of the arm portions are formed on opening sides which are the sides where the rollers are respectively inserted between the arm portions of the separator when the rollers are each inserted between the adjacent separators, it is possible to improve the operational efficiency for inserting the rollers. Accordingly, the efficiency in the assembly operation improves further, making it possible to further reduce the assembling cost.

Further, the separator for a linear guide apparatus of the present invention is applied to a linear guide apparatus comprising:

a guide rail comprising a rail raceway surface; and a slider disposed on the guide rail so as to be relatively movable and comprising:

a slider raceway surface for forming a roller raceway together with the rail raceway surface by opposing the rail raceway surface;

a pair of direction changing passages respectively continued from both ends of the rail raceway surface; and a roller return passage communicating with the pair of direction changing passages; and a plurality of rollers which circulate while rolling in an endless circulation passage formed by the rail raceway surface, the pair of direction changing passages, and the roller return passage.

Namely, if the separators of the invention are used in the linear guide apparatus, it is possible to improve the productivity of the linear guide apparatus. In addition, if the separators of the invention are used in the linear guide apparatus, it is possible to lessen the axial waggling (skew) and competitive rolling of the rolling elements, thereby making it possible to stably circulate the rolling elements. In particular, since it is possible to lower the sliding resistance between the arm portion of the separator itself and the guide groove during circulation in the endless circulation passage, it is possible to further improve the operability of the linear guide apparatus.

It is preferable that when a diameter of the roller is defined as Dw, a height of the separator is defined as $H_1$, a height of the arm portion is defined as $H_2$, and a groove width of the guide groove is defined as W, $(H_1-H_2)/2$ is set less than $(Dw-W)/2$.

According to the linear guide apparatus of the invention, the diameter of the roller is defined as Dw, the height of the separator is defined as $H_1$, the height of the arm portion is defined as $H_2$, and the groove width of the guide groove is defined as W, a setting is provided such that $(H_1-H_2)/2<(Dw-W)/2$. Therefore, even in a case where the gap between the adjacent rollers is large, the separator does not come into contact with the roller rolling surface of the circulation passage. Accordingly, it is possible to prevent the early wear, deformation, and the like of the separator.

It is preferable that when the diameter of the roller is defined as Dw, and the thickness of the arm portion defined by a vertical direction of the slider raceway surface is defined as Tp, a thickness-diameter ratio Tp/Dw is set such that $$0.2 \leq Tp/Dw \leq 0.5.$$

In addition, it is preferable that the separator has an adjoining portion for separating the pair of roller contact surfaces, at least two kinds of separators having the adjoining portions with mutually different thicknesses are used among a plurality of separators used in the linear guide apparatus, and the separators having the different adjoining thicknesses are respectively provided with identification marks indicating a difference thereof.

Further, it is preferable that the separators having the different adjoining thicknesses are respectively set to different colors to indicate the difference thereof.

According to the invention, it is possible to improve the productivity of the linear guide apparatus.

Furthermore, according to the linear guide apparatus in accordance with the invention, the diameter of the roller is defined as Dw, the height of the separator is defined as $H_1$, the height of the arm portion is defined as $H_2$, and the groove width of the guide groove is defined as W, it is set that $(H_1-H_2)/2<(Dw-W)/2$. Therefore, even in the case where the gap between the adjacent rollers is large, the separator does not come into contact with the roller rolling surface of the circulation passage. Accordingly, it is possible to prevent the early wear, deformation, and the like of the separator.

In addition, according to the invention, when a skew has occurred, the skew angle is restricted by the guide surfaces on both sides, and the occurrence of movement of the separator is eliminated, making it possible to prevent an excess skew angle. At the same time, it is possible to prevent an increase in the movement resistance of the slider even in the linear guide apparatus in which the separators are respectively interposed between the rollers.

In addition, since the thickness-diameter ratio Tp/Dw is set in the range of Tp/Dw≦0.5, it is possible to make appropriate the skew angle when the skew has occurred in the roller, making it possible to prevent wear due to sliding friction. Further, since the thickness-diameter ratio Tp/Dw is set in the range of 0.2≦Tp/Dw, it is possible to prevent damage of the arm portions of the separators, thereby making it possible to improve the service life of the linear guide apparatus.

Moreover, the invention makes it possible to obtain advantages in enabling to easily perform the setting of the circulation direction clearance in the assembly operation, and enabling to enhance the visual identifiability of the separators having different adjoining thicknesses, thereby making it possible to attain efficiency in the assembly operation and inspection operation.

Furthermore, as the separators having different adjoining thicknesses are set to different colors to indicate the difference, an advantage is offered in that it is possible to further enhance the visual identifiability of the separators having different adjoining thicknesses.

DETAILED DESCRIPTION OF THE PREFERRED EMBODIMENTS

First Embodiment

Hereafter, a description will be given of a first embodiment of a separator for a linear guide apparatus in accordance with the invention and a linear guide apparatus in which the separators are incorporated.

Figure 1:
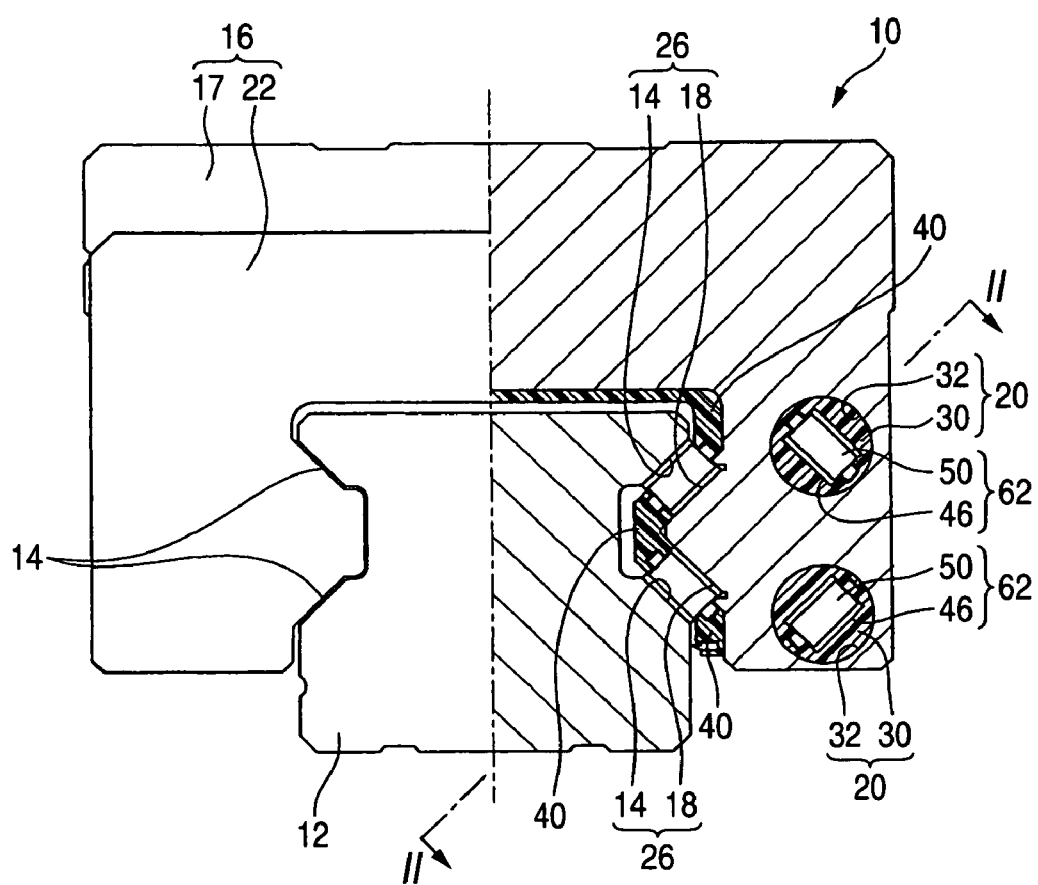
FIG. 1 is a fragmentary explanatory view illustrating a linear guide apparatus in which separators for a linear guide apparatus in accordance with the invention are incorporated.
Figure 2:
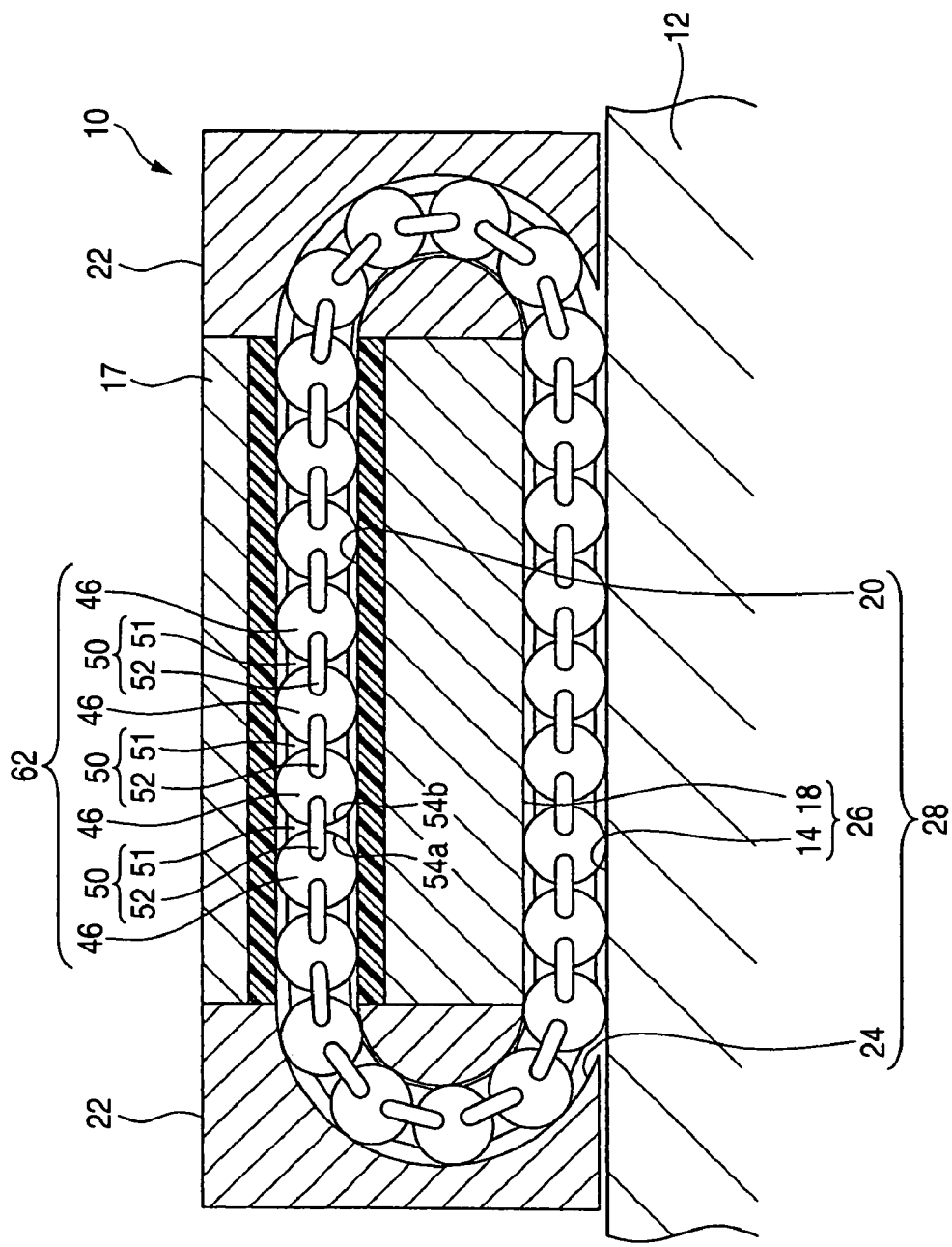
FIG. 2 is a cross-sectional view of a portion at line II-II in the linear guide apparatus shown in FIG. 1.

FIG. 1 is a fragmentary explanatory view illustrating the linear guide apparatus in which the separators for a linear guide apparatus in accordance with the invention are incorporated. FIG. 2 is a cross-sectional view of the portion at line II-II in the linear guide apparatus shown in FIG. 1.

As shown in FIGS. 1 and 2, this linear guide apparatus 10 is comprised of a guide rail 12 having rail raceway surfaces 14 as well as a slider 16 which is disposed in such a manner as to straddle the guide rail 12 movably relative thereto and which has slider raceway surfaces 18 respectively opposing the rail raceway surfaces 14.

The guide rail 12 has two rail raceway surfaces 14 on each side surface, i.e., four rail raceway surfaces 14 in total, which are formed along the longitudinal direction thereof. Meanwhile, the slider 16 is comprised of a slider body 17 and a pair of end caps 22 which are respectively fitted to both axial ends of the slider body 17.

The axially continuous shapes of the slider body 17 and the end cap 22 are both substantially U-shaped cross-sectional shapes. As for the end caps 22, a pair of direction changing passages 24, which continue to both ends of the slider raceway surface 18, are respectively formed in their interiors. In addition, a total of the four slider raceway surfaces 18 respectively opposing the rail raceway surfaces 14 of the guide rail 12 are formed on the inner sides of the substantially U-shaped slider body 17. Further, a roller return passage 20 communicating with each pair of direction changing passages 24 is formed inside the slider body 17.

The space sandwiched between the rail raceway surface 14 of the guide rail 12 and the slider raceway surface 18 of the slider body 17 opposing thereto constitutes a roller raceway 26. In addition, a total of four endless circulation passages 28 which are annularly continuous are each formed by the pair of direction changing passages 24, the roller return passage 20, and the roller raceway 26.

A plurality of cylindrical rollers 46 serving as rolling elements are charged in each endless circulation passage 28. A separator body 51 of a separator 50, which is made up of the separator body 51 and a pair of arm portions 52, is interposed between adjacent ones of the rollers 46.

Specifically, as shown in FIG. 2, each of the rollers 46 is sandwiched from both sides by respective roller contact surfaces 54a and 54b of the separator bodies 51 of the adjacent separators 50, and the skewing in the arrangement direction of the rollers 46 is restricted by the arm portions 52, 52 formed in pairs. Thus, the rollers 46 are constrained by the separators, and form a roller row 62 together with the separators 50.

Next, a more detailed description will be given of the portion where the roller row 62 is built in the linear guide apparatus 10.

Figure 3:
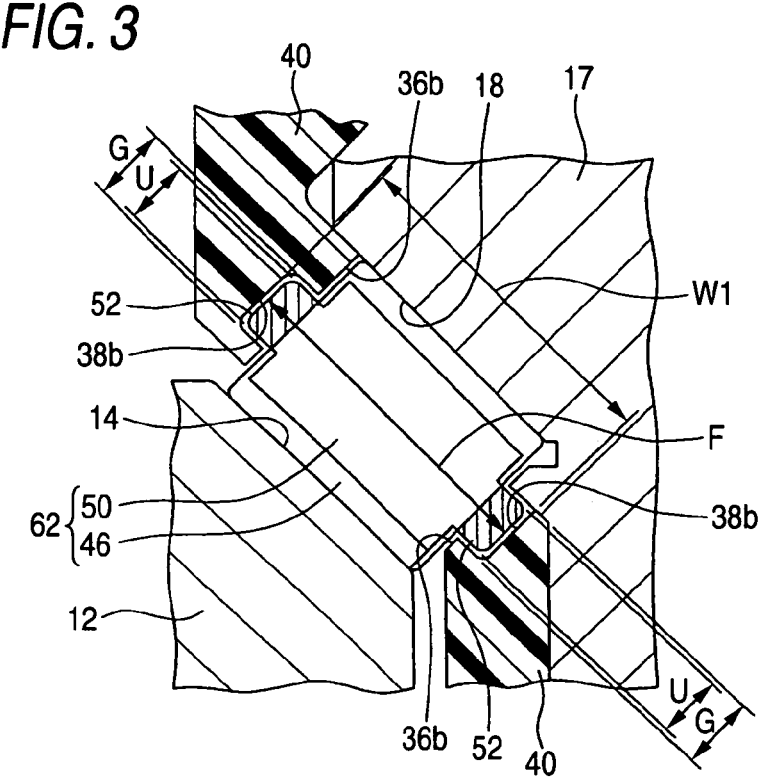
FIG. 3 is an explanatory view illustrating in enlarged form essential portions of the linear guide apparatus shown in FIG. 1.

As shown in FIGS. 1 and 3, inner side surfaces of the separator body 17, excluding portions used as the slider raceway surfaces 18, are covered with a synthetic resin-made retainer 40. It should be noted that a slight gap is formed between the retainer 40 and the surface of the guide rail 12 opposing the retainer 40. Further, grooves, into which the aforementioned roller rows 62 are respectively inserted, are each formed in the substantially U-shaped inner side of the slider body 17 by the slider raceway surface 18 and the retainer 40.

Specifically, the groove is formed by a pair of separator guide walls 36a, which are formed by the retainer 40. The width of the separator guide walls 36a opposing each other in the axial direction of the roller 46 is slightly larger than the length of the cylinder of the roller 46. Further, a guide groove 38b for allowing the arm portion 52 of the separator 50 to engage therewith is formed continuously in the separator guide wall 36b in its longitudinal direction. The groove height G of the guide groove 38b is slightly larger than the height U of the arm portion 52. Further, the width W1 between the guide grooves 38b opposing each other in the axial direction of the roller 46 is slightly larger than the maximum width F of the separator 50. For this reason, the arm portion 52 can be slidably engaged in the guide groove 38b.

Figure 4:
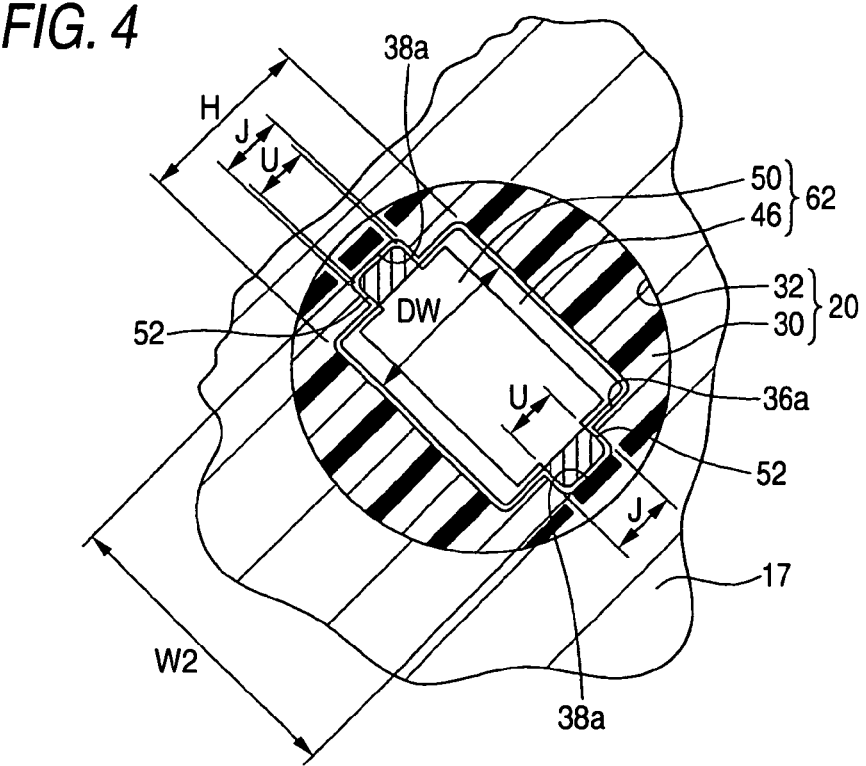
FIG. 4 is an explanatory view illustrating in enlarged form essential portions of the linear guide apparatus shown in FIG. 1.

In addition, as shown in FIGS. 2 and 4, the roller return passage 20 extending substantially in parallel with the respective slider raceway surface 18 at a predetermined interval therewith is formed in a thick-walled portion of a wing portion of the substantially U-shaped slider body 17. This roller return passage 20 is made up of a through hole 32 having a circular cross section which is continuous in the longitudinal direction, as well as a circulating tube 30 inserted in this through hole 32.

This circulating tube 30 is a synthetic resin-made tube. The cross-sectional shape of the internal space of the circulating tube 30 which is continuous in the longitudinal direction is formed with a substantially rectangular shape corresponding to projected shapes of the roller 46 and the separator 50 in the longitudinal direction of the cylinder.

Specifically, the width of this substantially rectangular cross section is slightly larger than the length of the cylinder of the roller 46. Further, the walls respectively opposing both ends of the rollers 46 which move within the circulating tube 30 are formed as separator guide walls 36a. A guide groove 38a having a width and a height capable of guiding the arm portion 52 while allowing the arm portion 52 to engage therewith is formed continuously in the longitudinal direction. Namely, the groove height J of the guide groove 38a is slightly larger than the height U of the arm portion 52. Further, the width W2 between the guide grooves 38a opposing each other in the axial direction of the roller 46 is slightly larger than the maximum width F of the separator 50. In addition, the height H of the rectangular cross section is slightly larger than the diameter Dw of the roller 46. For this reason, the arm portion 52 of the separator 50 can be slidably engaged in the guide groove 38a. Thus, the rollers 46 and the separators 50 are able to smoothly move through the space within the circulating tube 30.

As shown in FIG. 2, the pair of curved direction changing passages 24, which are respectively continued to both ends of the slider raceway surface 18 and communicate with the roller return passage 20, are formed in the end caps 22. This direction changing passage 24 is formed by a through hole which is continuously curved in its longitudinal direction.

Specifically, the direction changing passage 24 is formed with a substantially rectangular cross-sectional shape corresponding to the projected shape of the roller 46 in the longitudinal direction of its cylinder so that the rollers 46 can pass through its interior. Walls of the direction changing passage 24 respectively opposing the both ends of the rollers 46 moving within the direction changing passage 24 are formed as the separator guide walls. The width of the separator guide walls opposing each other in the axial direction of the roller 46 is slightly larger than the length of the cylinder of the roller 46. Further, the height of the substantially rectangular cross section is slightly larger than the diameter of the roller 46. For this reason, a roller row 62, which is formed by the rollers 46 and the separators 50, is able to move smoothly through the space within the direction changing passage 24. It should be noted that the roller row 62 moves within the direction changing passage 24 while the rollers 46 of the entire roller row 62 rotate. For this reason, the height of the guide groove in the direction changing passage 24 is made slightly larger by taking into consideration a curvature conforming to the range of rotation of the arm portions 52. It should be noted that since the transverse sectional shape of the direction changing passage 24 is similar to that of the circulating tube 30 of the roller return passage 20, the illustration of the cross section is omitted.

Next, referring to FIG. 5, a more detailed description will be given of the separator 50. It should be noted that FIGS. 5A to 5C are enlarged explanatory views of the separator 50, in which FIG. 5A is a front elevational view of the separator 50, FIG. 5B is a plan view thereof, and FIG. 5C is a right side view thereof.

The separator 50 is integrally molded from an elastic synthetic resin. As shown in FIG. 5A, the separator 50 is made up of the separator body 51 and the pair of arm portions 52.

Figure 5A:
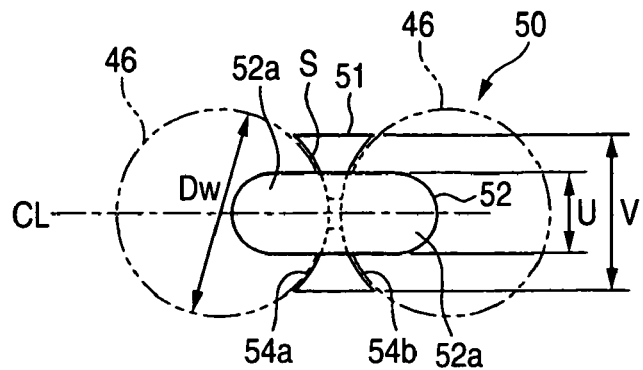
FIG. 5A is an enlarged front elevational view of the separator in accordance with a first embodiment of the invention.

Specifically, as shown in FIG. 5A, the height V of the separator body 51 is lower than the diameter Dw of the roller 46. Further, the one roller contact surface 54a is formed in such a manner as to face one adjacent roller 46 which is individually brought into contact therewith, while the other roller contact surface 54b is formed on the side of the other adjacent roller 46 which is individually brought into contact therewith, in such a manner as to face the opposite side to the roller contact surface 54a. In addition, the roller contact surfaces 54a and 54b are each formed by a concave surface (concave curved surface in this embodiment) corresponding to an outer peripheral surface S which is a rolling surface of the roller 46, so as to be able to hold the roller 46 between the adjacent separator bodies 51 while rotatably supporting it.

Figure 5B:
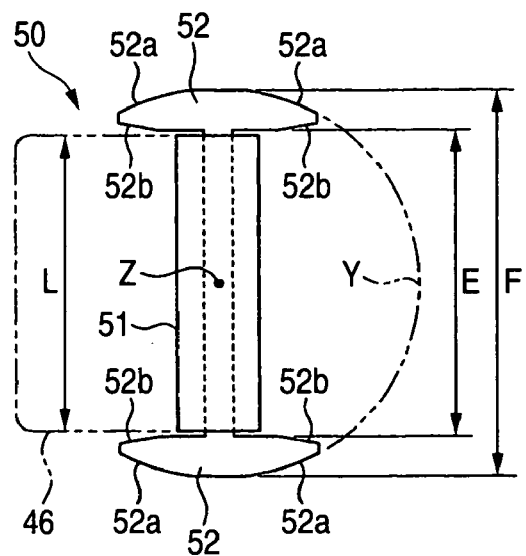
FIG. 5B is an enlarged plan view of the separator in accordance with the first embodiment of the invention.
Figure 5C:
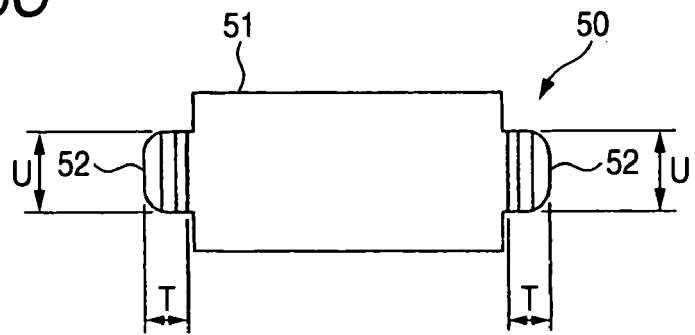
FIG. 5C is an enlarged right side view of the separator in accordance with the first embodiment of the invention.

As shown in FIG. 5B, the arm portions 52 and 52 formed in pairs are formed so as to permit the stable rolling of the rollers 46 with their axes arranged in parallel in the arrangement direction in which the rollers 46 continue within the endless circulation passage 28. Namely, each of the arm portions 52 and 52 juts out from each end of the separator body 51 toward each of the adjacent rollers 46 in the direction toward the center of the adjacent roller 46 along with the end face of the roller 46.

Each of the arm portions 52 and 52 has a predetermined height U and a predetermined width T for being guided by each of the guide grooves 38a and 38b (see FIG. 5C). Namely, the predetermined height U of each of the arm portions 52 and 52 is slightly smaller than the groove height J and G of the guide groove 38a and the guide groove 38b. In addition, the predetermined width T is formed with a necessary and sufficient width for allowing the arm portion to be guided while being stably engaged with each of the guide grooves 38a and 38b. As shown in FIG. 5B, the interval E defined between the pair of arm portions 52 is slightly larger than the length L of the cylinder of the roller 46. For this reason, the arm portion 52 is so constructed as to be capable of being slidably engaged with each of the guide groove 38a and the guide groove 38b while rotatably holding the roller 46.

Here, the planar shape (the shape shown in FIG. 5B) of the separator 50 is a projected shape in a direction (direction perpendicular to the chain line shown in FIG. 5A) normal to a plane including the axes of the adjacent rollers 46. The separator 50 is formed such that its maximum dimension in this planar shape (projected shape) is not more than the maximum width F of the separator 50. Further, the maximum dimension in this planar shape is formed with an outside dimension which is not more than the width W1 between the guide grooves 38b or the width W2 between the guide grooves 38a. In other words, as shown in FIG. 5B, the planar shape of the separator 50 is formed so as to be accommodated in a circle Y, i.e., a reference circle Y, whose center is the center Z of figure of the planar shape of the separator 50 and whose diameter is the maximum width F of the separator 50 (hereafter, this circle will be referred to as the reference circle).

Further, a surface 52a, which extends from the fixed end side of the arm portion 52 toward its free end along a circular arc Y whose center is the center Z of figure of the aforementioned planar shape and whose diameter is the maximum width F of the separator 50, is formed on the surface of the arm portion 52 on the side where each of the pair of arm portions 52 and 52 opposes the guide groove 38a or the guide groove 38b. It should be noted that the surface of the arm portion 52 which opposes each of the guide groove 38a and the guide groove 38b in the widthwise direction of the separator 50 is formed by a linear line (planar surface). Further, the surface 52a is formed in such a manner as to continue with a gentle slope from this linear line (planar surface) portion toward the free end of the arm portion 52.

In addition, as for the distance E between the mutually opposing two surfaces of the pair of arm portions 52 and 52, the distance on the free end sides of the arm portions 52 and 52 is made larger (broader) than the distance on the fixed end sides thereof. Namely, guide surfaces 52b are formed on the mutually opposing surfaces of the pair of arm portions 52 and 52 for widening the distance between the opposing two surfaces from the fixed end sides toward the free ends of the arm portions 52 and 52.

Next, a description will be given of the operation and effects of the linear guide apparatus 10 using the separators 50 in accordance with the invention.

In the linear guide apparatus 10 having the above-described construction, if the slider 16 is relatively moved in the axial direction of the guide rail 12, the rollers 46 move in the endless circulation passage 28 while rotating, and the separators 50 also move in the endless circulation passage 28 together with the rollers 46. At this time, the separator body 51 of each separator 50 in the endless circulation passage 28 pushes the roller 46 located forwardly in its moving direction, and that roller 46, in turn, pushes the separator body 51 located forwardly in its moving direction. Namely, the entire roller row 62 circulatingly moves in the endless circulation passage 28.

The roller row 62 is able to repeat circulation in which the roller row 62 moves in the roller raceway 26 in the opposite direction to the slider 16, changes its moving direction on entering the one direction changing passage 24 continuing from the one end portion of the roller raceway 26, enters the roller return passage 20 from the direction changing passage 24 to move in the same direction as the slider 16, and enters the other direction changing passage 24 and changes its moving direction to return to the roller raceway 26.

According to this linear guide apparatus 10, since the separator body 51 is interposed between the rollers 46, the rollers 46 are not brought into direct contact with each other, so that the occurrence of noise and wear due to the rubbing of the rollers 46 against each other is prevented. In addition, each roller 46 is held by being sandwiched by the roller contact surfaces 54a and 54b of the separators 50 (separator bodies 51) adjacent to each roller 46 from both sides thereof. Further, since the roller 46 is restricted by the arm portions 52 of the separators 50, the respective center axes of the rollers 46 are maintained in a parallel state, so that the rollers 46 are able to move while rotating stably in the endless circulation passage 28 and while maintaining a predetermined attitude and a predetermined interval.

Further, the rollers 46 are subjected to resistance in the roller raceway 26, but since each roller 46 is pushed by the separator body 51 from behind, each roller is able to move smoothly within the roller raceway 26. In addition, an interval between the separator guide walls 36b within the roller raceway 26 is merely slightly larger than the length of the cylinder of the roller 46, and the arm portion 52 of each separator 50 is guided by being engaged in the guide groove 38b of the separator guide wall 36b. For this reason, the skewing or the like of each separator body 51 within the roller raceway 26 is stably prevented, and it is possible to prevent the arrangement of the roller row 62 from becoming disturbed and its smooth movement from being hampered, In addition, since the arm portions 52 of the separators 50 are guided in the endless circulation passage 28 along the guide groove 38a or the guide groove 38b, the waggle of the separators 50 when moving is restricted, and the waggle of the rollers 46 each held by the separators 50 between its arm portions 52 is also restricted, so that the entire roller row 62 is capable of moving accurately and smoothly within the endless circulation passage 28. Accordingly, since the axial waggling (skew) of the rollers 46 is effectively prevented, no excess force is applied to the roller row 62.

Furthermore, the separator 50 has its arm portions 52 and 52 respectively engaged in the guide groove 38a and the guide groove 38b, and each roller 46 held between the separators 50 is supported and held by the roller contact surfaces 54a and 54b, the roller row 62 is prevented from falling off the slider 16 when the slider 16 is drawn out from the guide rail 12.

Incidentally, the functions and performance required of the separator 50 and the linear guide apparatus 10 are not only the functions and performance in the state in which they are actually incorporated in a product. For example, the adoption of a functional configuration which contributes to the improvement of productivity is an important requirement. Namely, in this separator 50, a suitable configuration is adopted in improving productivity in the assembling operation and the like in which while the respective separator 50 is being interposed between the adjacent rollers 46, these members are inserted into the endless circulation passage 28 from outside the retainer.

Specifically, the surface 52a, which extends from the fixed end side of the arm portion 52 toward its free end along the circular arc whose center is the center Z of figure of the aforementioned projected shape and whose diameter is the maximum width F of the separator 50, is formed on the surface of the arm portion 52 on the side where each of the pair of arm portions 52 and 52 opposes the guide groove 38a or the guide groove 38b. Namely, the surface 52a is formed on the arm portion 52 of the separator 50 such that the opposition distance to the guide groove 38a or the guide groove 38b becomes wider toward its free end.

For this reason, when the separator is inserted into the guide groove 38b from outside the retainer 40, the separator is inserted while being guided in conformity to this surface 52a. Namely, the separator 50 can be inserted smoothly into the guide groove 38b. Therefore, it is possible to alleviate damage such as the bending of the arm portion 52 of the separator 50. As a result, an assembly operator is able to alleviate his or her attention to be paid to the assembling operation. In addition, by virtue of this surface 52a, it is possible to lessen the sliding resistance of the separator 50 with respect to the guide groove 38a or the guide groove 38b during the circulation in the endless circulation passage, and to thereby improve the operability of the linear guide apparatus 10.

Further, the maximum dimension in the planar shape of the separator 50 is set to be less than the maximum width F of the separator 50 (see FIG. 5B). In addition, the maximum dimension in that planar shape is formed with an outside dimension which is not more than the width W1 between the guide grooves 38b or the width W2 between the guide grooves 38a. In other words, the planar shape of the separator 50 is formed so as to be accommodated in the reference circle Y.

Figure 6:
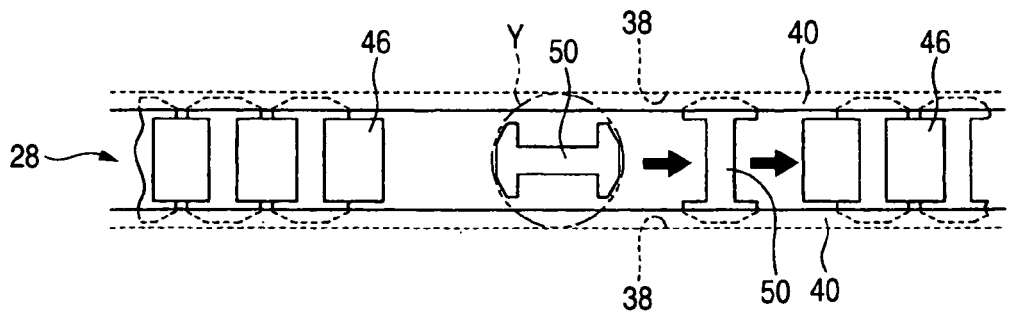
FIG. 6 is a partially enlarged explanatory view explaining a state of assembly when the separators in accordance with the invention are each interposed between adjacent ones of the rollers to form a roller row.

For this reason, as shown in FIG. 6, according to this separator 50, the separator can be easily rotated in the guide groove 38b by using its center as the center Z of figure of that planar shape and by using as its axis a normal line to a plane including the axes of the adjacent rollers. It should be noted that, as shown in the same drawing, the circle having as its axis a normal line to the plane including the axes of the adjacent rollers is the reference circle Y.

For this reason, according to this separator 50, the separator 50 can be inserted into the guide groove 38b formed by the retainer 40 and the like from outside the retainer 40 with practically no interference. Therefore, it is possible to prevent damage such as the bending of the arm portion 52 of the separator 50. As a result, the assembly operator is able to further alleviate his or her attention to be paid to the assembling operation, so that the operating efficiency improves further, making it possible to further reduce the assembling cost. It should be noted that, in FIG. 6, an image in which the separator 50 is inserted from outside the retainer 40 and is assembled by being rotated in the guide groove 38b is expressed by solid arrows.

Still further, as for the distance E between the mutually opposing two surfaces of the pair of arm portions 52 and 52, the distance on the free end sides of the arm portions 52 and 52 is made larger (broader) than the distance on the fixed end sides thereof. Namely, the guide surfaces 52b are respectively formed on the mutually opposing surfaces of the pair of arm portions 52 and 52 for widening the distance between the opposing two surfaces from the fixed end sides toward the free ends of the arm portions 52 and 52. For this reason, when the roller 46 is inserted between the adjacent separators 50, the roller 46 can be inserted while the end face of the roller 46 is being guided in conformity to this guide surface 52b, so that the operating efficiency in assembling can be further improved. Accordingly, it is possible to provide the separator 50 for a linear guide apparatus which makes it possible to further improve the productivity of the linear guide apparatus 10.

It should be noted that the separator for a linear guide apparatus and the linear guide apparatus in accordance with the invention are not limited to the above-described embodiment, and may be constructed arbitrarily insofar as they do not depart from the gist of the invention.

Namely, the separator and the linear guide apparatus in accordance with the invention are sufficient if the separator (particularly its arm portion) and the guide groove do not strongly interfere with each other when the separator (particularly the arm portion) is built into the guide groove. Namely, the outer shape of the arm portion is sufficient if the outer shape of the separator (particularly the arm portion) is substantially virtually equal to or smaller than the groove width of the guide groove in terms of the mutual dimensional relationship involved in the interference of the arm portion with the guide groove.

For example, in the above-described embodiment, as the surface which extends along the reference circle Y whose center is the center Z of figure of the planar shape and whose diameter is the maximum width F of the separator 50, the surface 52a is formed by a curve which is a circular arc of the reference circle Y, but the invention is not limited to the same. This surface configuration is formed to improve the insertability at the time of building in the separator 50 and to improve the operability of the linear guide apparatus 10 by lessening the sliding resistance of the separator 50 itself during the circulation in the endless circulation passage. Namely, it suffices if, on the surface of the arm portion 52 on the side where each of the pair of arm portions 52 and the guide groove 38a or the guide groove 38b are opposed, a surface for enlarging the opposition distance between the arm portion 52 and the guide groove 38a or the guide groove 38b from the fixed end side toward the free end side of the arm portion 52 is formed up to the free end of the arm portion 52.

Figure 7A:
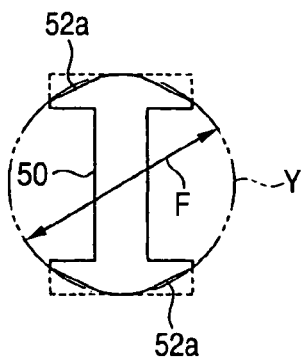
FIG. 7A is an explanatory diagram of a modification of the first embodiment.
Figure 7B:
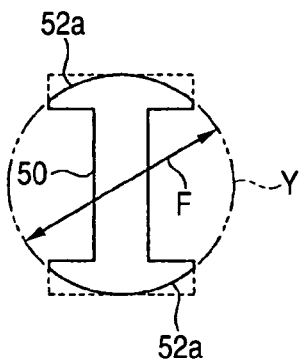
FIG. 7B is an explanatory diagram of another modification of the first embodiment.
Figure 7C:
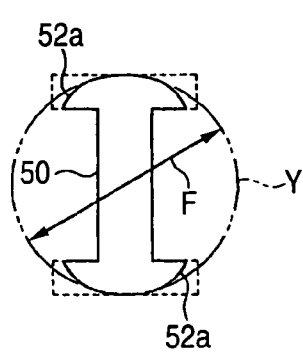
FIG. 7C is an explanatory diagram of still another modification of the first embodiment.

For this reason, it is possible to adopt configurations such as those shown in FIGS. 7A to 7C as modifications. Specifically, as in the modification shown in FIG. 7A, the surface 52a may be formed by a straight line instead of the surface extending along the reference circle Y. Further, that straight line may be formed by being directed gradually toward the inner side of the reference circle Y toward the free end side of the arm portion 52. In addition, as in the modification shown in FIG. 7B, the surface 52a may be integrally formed by a circular arc which practically conforms to the reference circle Y as the surface extending along the reference circle Y. Furthermore, the surface 52a may be formed by a smaller circular arc as in the drawing, instead of the surface extending along the reference circle Y. Further, the surface 52a may be formed by gradually directing the free end side of that circular arc toward the inner side of the reference circle Y, as in the drawing.

Figure 8A:
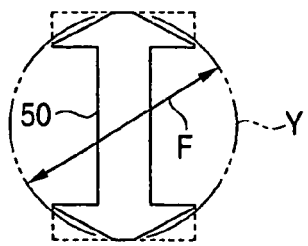
FIG. 8A is an explanatory diagram of a further modification of the first embodiment.
Figure 8B:
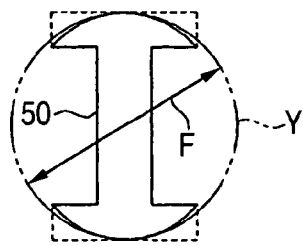
FIG. 8B is an explanatory diagram of a further modification of the first embodiment.
Figure 8C:
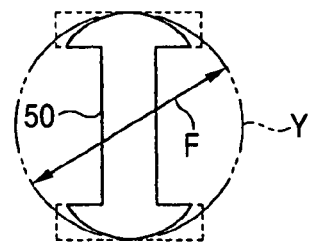
FIG. 8C is an explanatory diagram of a further modification of the first embodiment.

In addition, although, in the above-described embodiment, for example, the surface of the arm portion 52 which opposes the guide groove 38a or the guide groove 38b in the widthwise direction of the separator 50 is formed by a straight line (flat surface), the invention is not limited to the same. For instance, as shown as modifications in FIG. 8, this surface of the arm portion 52 may be formed by a curve (curved surface). Further, as shown in the drawing, instead of the surface configuration extending along the reference circle Y, the surface maybe formed in such a manner as to immediately move away from the reference circle Y other than the portion of the arm portion 52 which abuts against the guide groove 38a or the guide groove 38b in the widthwise direction of the separator 50, as shown in FIGS. 7A to 7C.

Figure 9A:
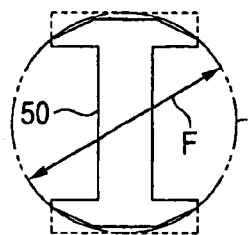
FIG. 9A is an explanatory diagram of a further modification of the first embodiment.
Figure 9B:
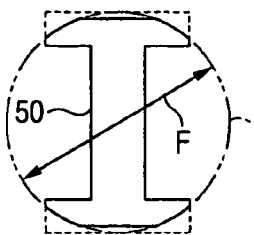
FIG. 9B is an explanatory diagram of a further modification of the first embodiment.
Figure 9C:
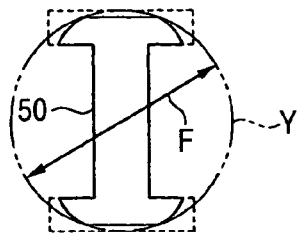
FIG. 9C is an explanatory diagram of a further modification of the first embodiment.

In addition, although, in the above-described embodiment, for example, the maximum width F (the widthwise dimension of the separator 50) of the separator body 51 in the separator 50 is set to be a dimension slightly smaller than the width W1 between the guide grooves 38b or the width W2 between the guide grooves 38a opposing each other in the axial direction of the roller 46, the invention is not limited to the same. For example, as shown as modifications in FIG. 9, the maximum width F may be formed to be narrower than the width between the guide grooves 38a or 38b. It should be noted that, in FIGS. 9A to 9C, the configurations of the separators 50 other than their widthwise dimensions correspond to the surface configurations shown in FIGS. 7A to 7C and are respectively similar thereto, so that a description thereof will be omitted.

Figure 10A:
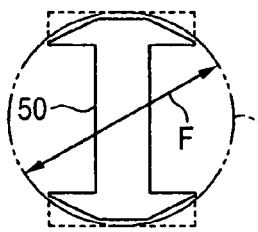
FIG. 10A is an explanatory diagram of a further modification of the first embodiment.
Figure 10B:
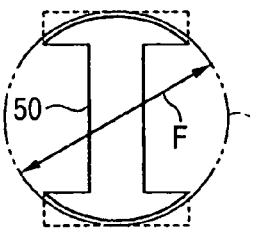
FIG. 10B is an explanatory diagram of a further modification of the first embodiment.
Figure 10C:
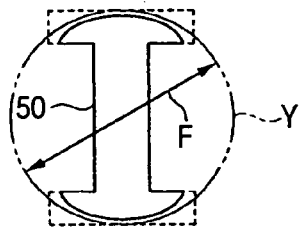
FIG. 10C is an explanatory diagram of a further modification of the first embodiment.

In addition, as shown as modifications in FIG. 10, the surface configurations formed on the arm portions 52 may be formed by various configurations in which the surface configurations are respectively offset toward the inner side of the reference circle Y, in addition to the modifications shown in FIG. 9 referred to above. It should be noted that, apart from the fact that the surface configurations of the separators 50 are respectively offset toward the inner side of the reference circle Y, the respective configurations in FIGS. 10A to 10C, which are examples of various configurations, correspond to the surface configurations shown in FIGS. 7A to 7C and are respectively similar thereto, so that a description thereof will be omitted.

Figure 11A:
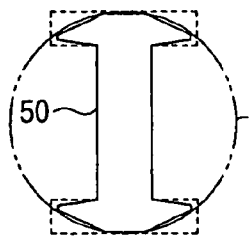
FIG. 11A is an explanatory diagram of a further modification of the first embodiment.
Figure 11B:
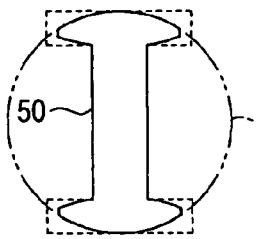
FIG. 11B is an explanatory diagram of a further modification of the first embodiment.
Figure 11C:
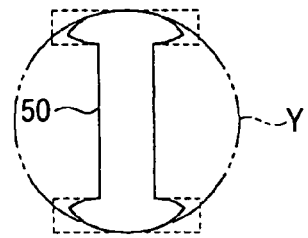
FIG. 11C is an explanatory diagram of a further modification of the first embodiment.
Figure 12:
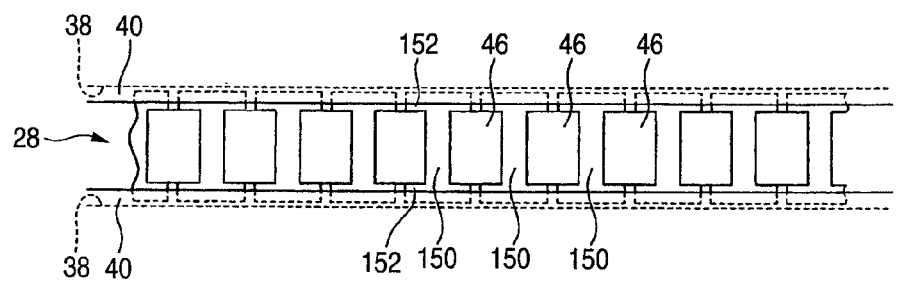
FIG. 12 is a partially enlarged explanatory view explaining a roller row in which conventional separators are each interposed between adjacent ones of the rollers.
Figure 13:
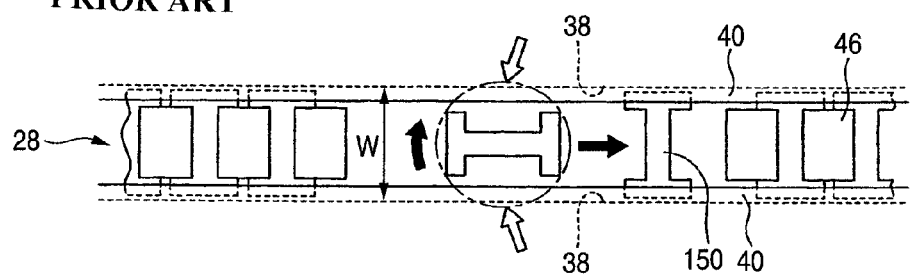
FIG. 13 is a partially enlarged explanatory view explaining a state of assembly when the conventional separators are each interposed between adjacent ones of the rollers to form a roller row.

In addition, although, in the above-described embodiment, for example, the guide surfaces 52b are respectively formed on the mutually opposing surfaces of the pair of arm portions 52 and 52 for widening the distance between the opposing two surfaces from the fixed end sides toward the free ends of the arm portions 52 and 52, the shape of the guide surface 52b is not limited to the same. Namely, also as for the width and the surface configuration of the guide surface 52b on the inner side of this arm portion, the inclination of the surface and the configuration of the surface can be modified, as shown in FIGS. 7 to 10 referred to above. For example, as shown in FIG. 11, it is possible to adopt configurations constituted by a straight line or a curve or a combination thereof. It should be noted that, in FIGS. 11A to 11C, the configurations other than the guide surfaces serving as the roller insertion portions correspond to the respective surface configurations shown in FIGS. 7A to 7C and are modified configurations which are respectively similar, so that a description thereof will be omitted.

Second Embodiment

Figure 16:
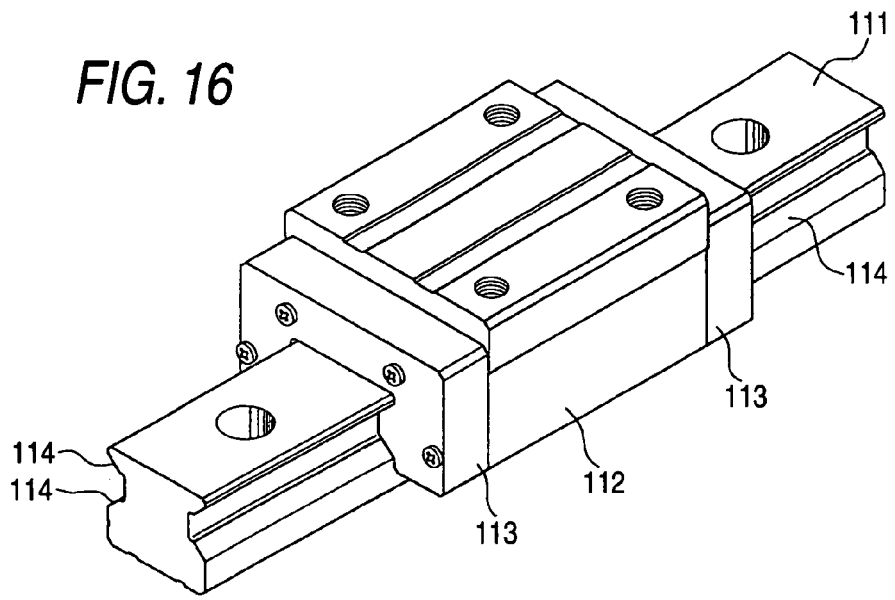
FIG. 16 is a perspective view of the linear guide apparatus.
Figure 17:
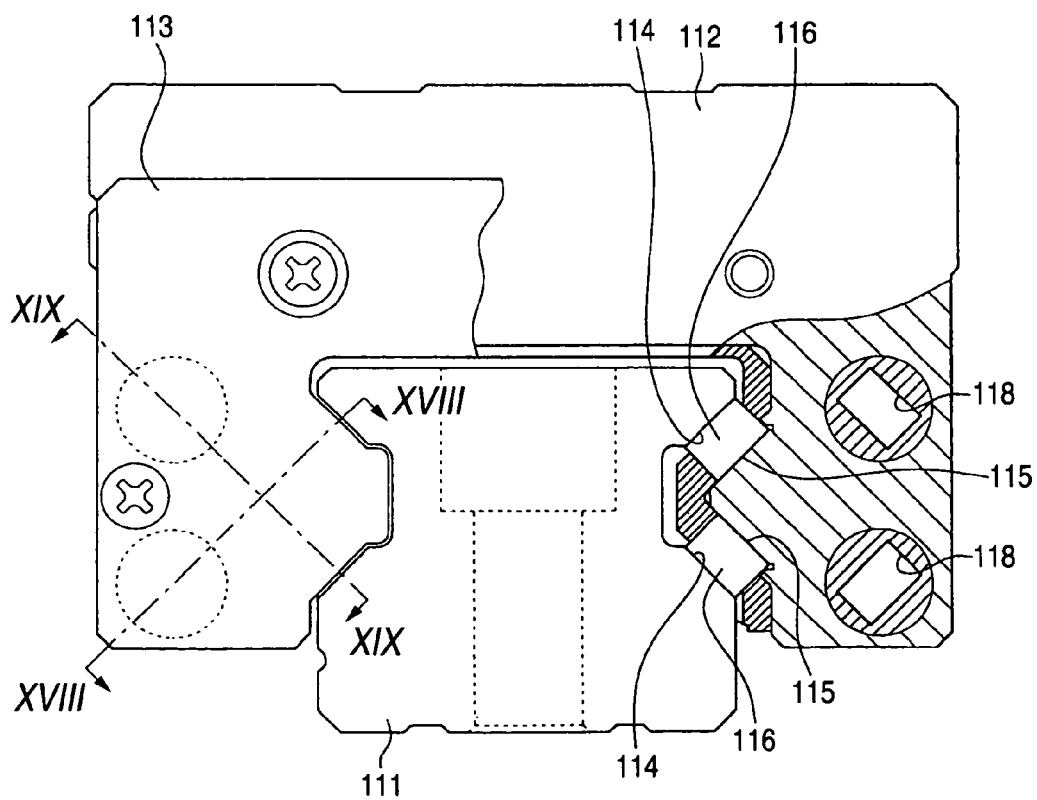
FIG. 17 is a front elevational view of the linear guide apparatus shown in FIG. 16.
Figure 18:
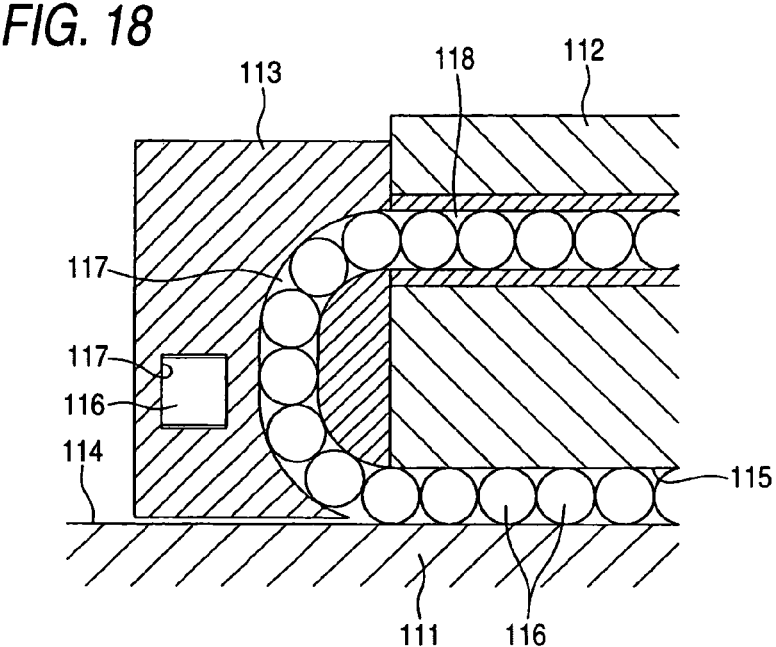
FIG. 18 is a cross-sectional view taken along line XVIII-XVIII in FIG. 17.
Figure 19:
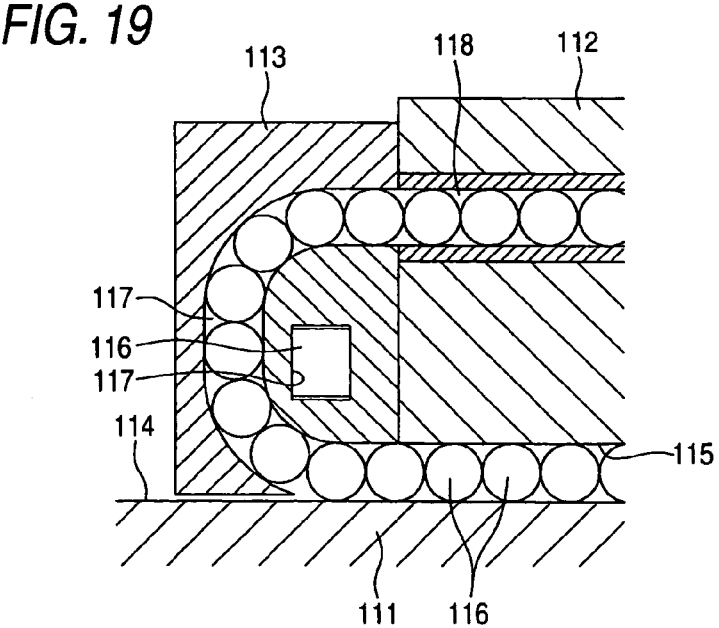
FIG. 19 is a cross-sectional view taken along line XIX-XIX in FIG. 17.
Figure 20:
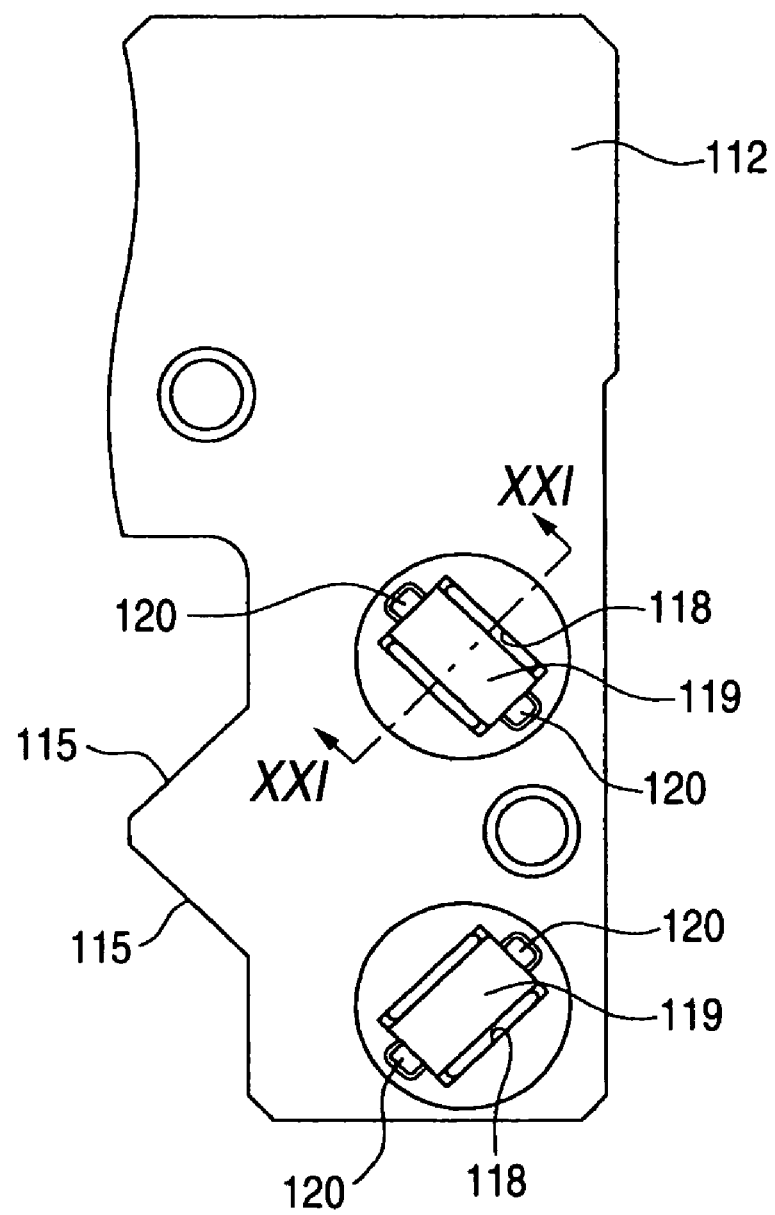
FIG. 20 is a diagram illustrating a slider body of the linear guide apparatus in which the separators are each interposed between the rollers.
Figure 21:
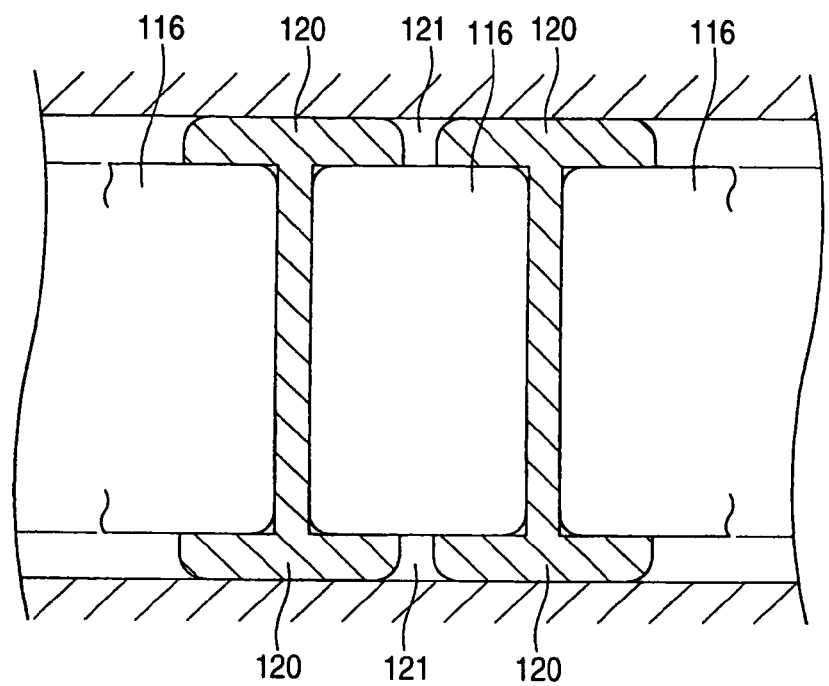
FIG. 21 is a cross-sectional view taken along line XXII-XXII in FIG. 20.
Figure 22:
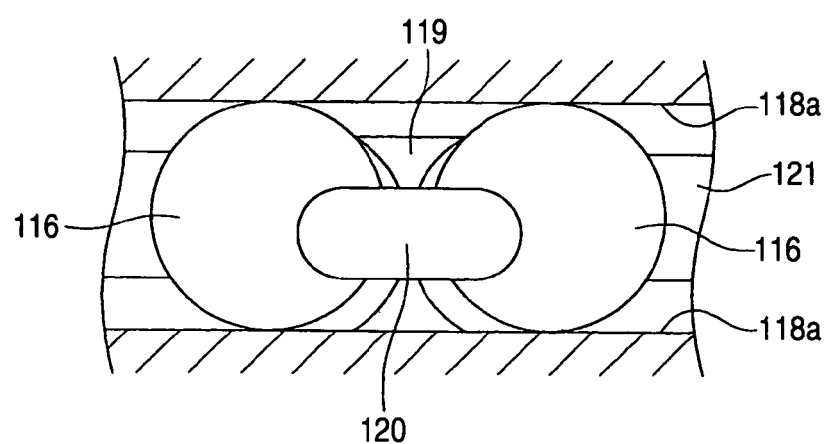
FIG. 22 is a diagram for explaining the problems to be solved by the invention.

In linear guide apparatuses used in machine tools, there are many cases where rollers are used as rolling elements. As shown in FIG. 16, such a linear guide apparatus is comprised of a guide rail 111, a slider body 112 having on its left and right sides inner side surfaces respectively opposing the side surfaces of this guide rail 111, and a pair of end caps 113 which are respectively fitted to both longitudinal ends of the slider body 112. Two planar rail raceway surfaces 114 are formed on each of the side surfaces of the guide rail 111. This rail raceway surface 114 opposes each of two planar slider raceway surfaces 115 (see FIG. 17) formed on each of the inner side surfaces of the slider body 112. Pluralities of rollers 116 are provided between the rail raceway surface 114 and the slider raceway surface 115. These rollers 116 are adapted to roll on the raceway surfaces 114 and 115 when the slider consisting of the slider body 112 and the end caps 113 relatively moves in the longitudinal direction of the guide rail 111. As shown in FIGS. 18 and 19, the rollers 116 which rolled on the raceway surfaces 114 and 115 are adapted to endlessly circulate through a direction changing passage 117 formed in the end cap 113 and a circulation passage 118 formed in the slider body 112.

In such a linear guide apparatus, if a following roller collides against a preceding roller, the rolling direction of the roller becomes opposite between the adjacent rollers, with the result that there is a problem that the smooth operation of the slider is hampered. In addition, there is another problem in that if the slider is separated from the guide rail, the rollers fall off the slider.

Accordingly, the present inventors have devised a linear guide apparatus in which resin-made separators 119 each having at its left and right side surface portions a pair of arm portions 120 for holding the rollers 116 are each disposed between the rollers 116, and a pair of guide grooves 121 for guiding the separators 119 through the arm portions 120 in the rolling direction of the rollers are formed in the inner wall surface of the circulation passage 118.

In such a linear guide apparatus, since the following roller does not collide against the preceding roller, it is possible to prevent the generation of noise due to the collision between the rollers and a decline in the operability of the slider, and to prevent the rollers from falling off the slider. However, in a case where the gap between the adjacent rollers is large, a problem conceivably occurs in that the separator 119 comes into contact with a roller rolling surface 118a of the circulation passage 118, with the result that the separator becomes worn or deformed at an early period.

Accordingly, in the invention, by taking note of the above-described problems a linear guide apparatus is provided which is capable of preventing early wear, deformation, and the like of the separator.

Hereafter, a description will be given of the embodiment of the invention with reference to the drawings. It should be noted that the same portions as those shown in FIGS. 16 to 22 are denoted by the same reference numerals, and a description of those portions will be omitted.

Figure 14:
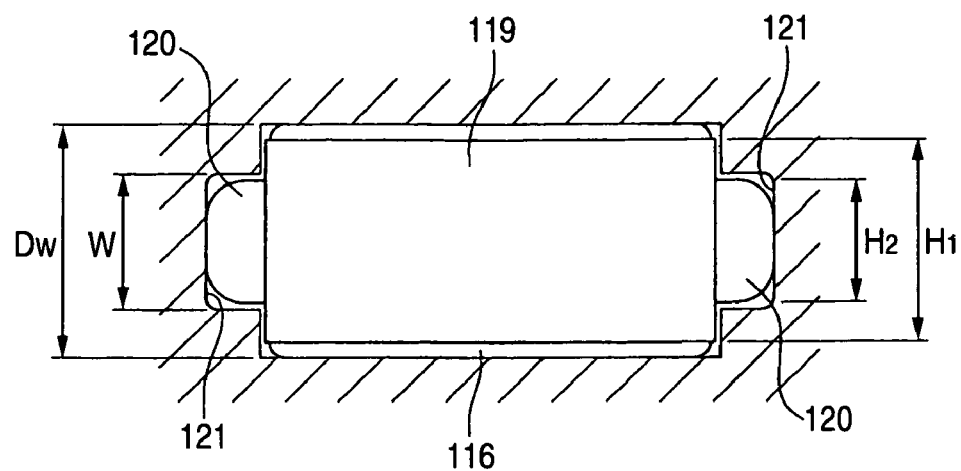
FIG. 14 is a diagram illustrating essential portions of a linear guide apparatus shown in accordance with a second embodiment of the invention.

FIG. 14 is a diagram illustrating essential portions of the linear guide apparatus in accordance with the embodiment of the invention. As shown in the drawing, in the linear guide apparatus in accordance with the embodiment of the invention, when the diameter of the roller 116 is defined as Dw, the height of the separator 119 is defined as $H_1$ (<Dw), the height of the arm portion 120 is defined as $H_2$, and the groove width of the guide groove 121 is defined as W, a setting is provided such that $(H_1-H_2)/2<(Dw-W)/2$.

Figure 15:
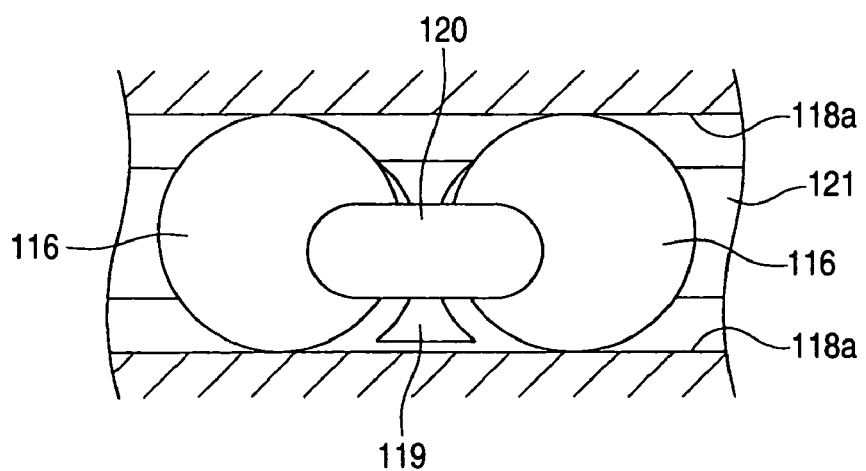
FIG. 15 is a diagram for explaining the operation of the linear guide apparatus shown in accordance with the second embodiment of the invention.

If $(H_1-H_2)/2$ is thus made smaller than $(Dw-W)/2$, even in the case where the gap between the adjacent rollers is large, the separator 119 does not come into contact with the roller rolling surface 118a of the circulation passage 118, as shown in FIG. 15. Accordingly, it is possible to prevent the early wear, deformation, and the like of the separator, thereby making it possible to improve the reliability of the linear guide apparatus. In addition, it is possible to prevent the hampering of the smooth rolling speed of the roller 116 due to the contact of the separator 119 with the roller rolling surface 118a of the circulation passage 118, and prevent a decline in the retaining function of the separator 119 with respect to the rollers 116 due to the wear of the separator 119.

Third Embodiment

Hereafter, referring to the drawings, a description will be given of an embodiment of the linear guide apparatus in accordance with the invention.

Figure 23:
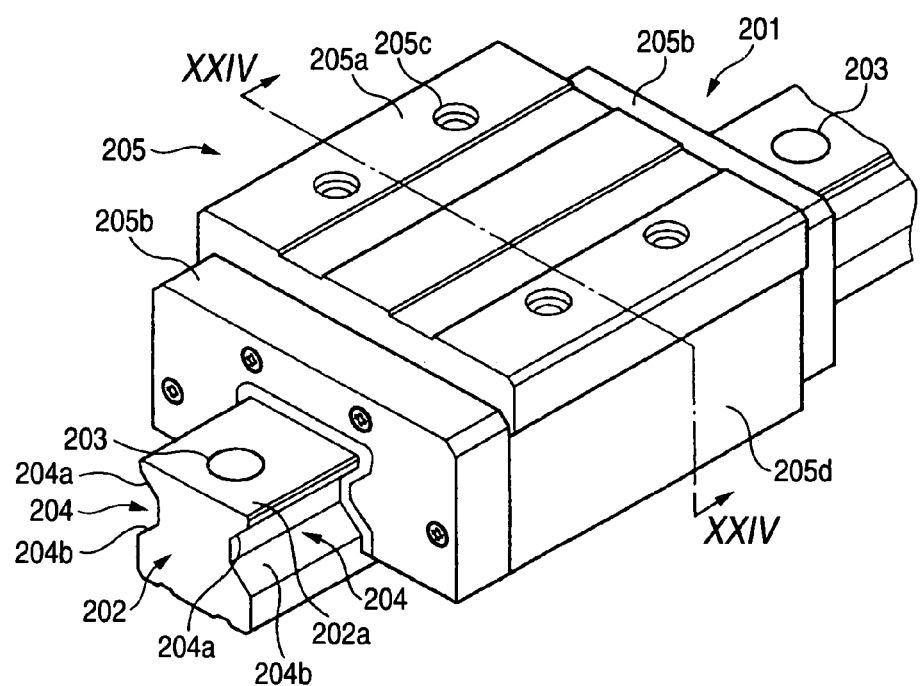
FIG. 23 is a perspective view illustrating the linear guide apparatus in accordance with a third embodiment of the invention.
Figure 24:
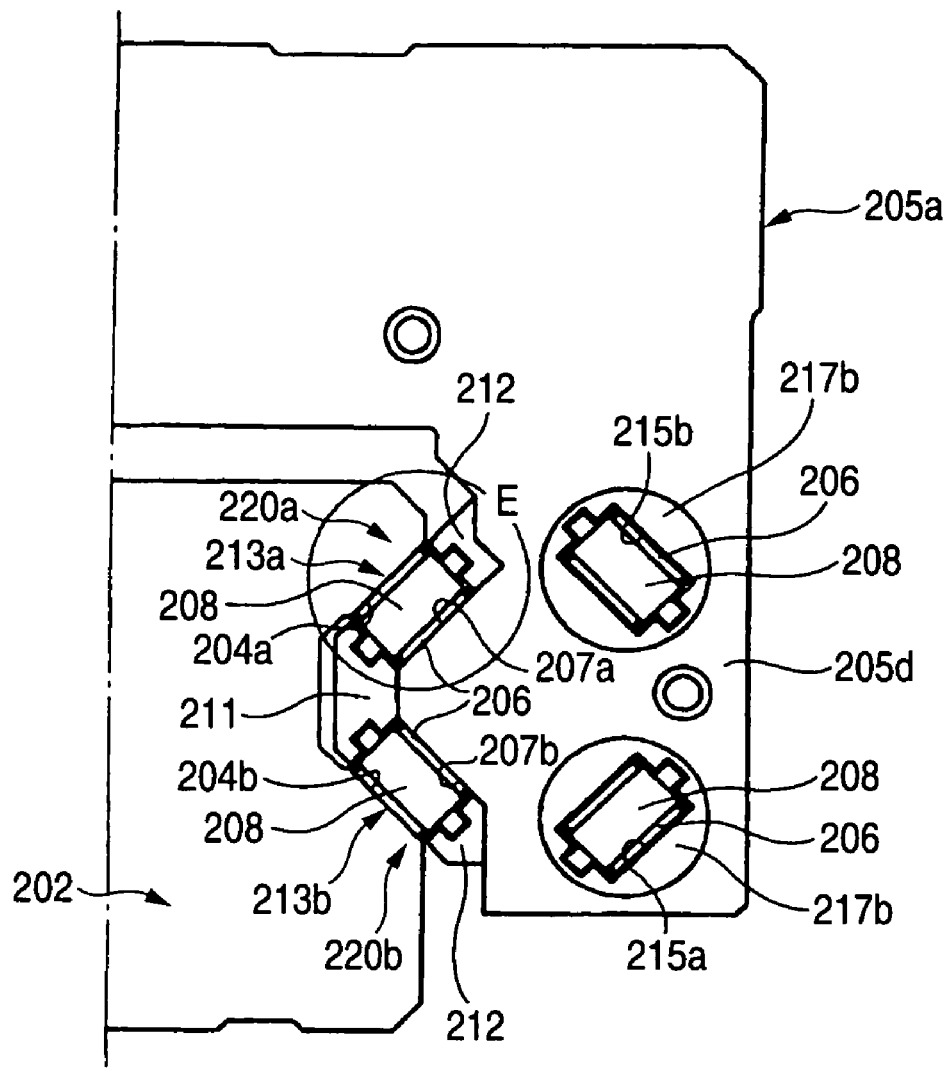
FIG. 24 is a right side half cross-sectional view taken along line XXIV-XXIV in FIG. 23.
Figure 25:
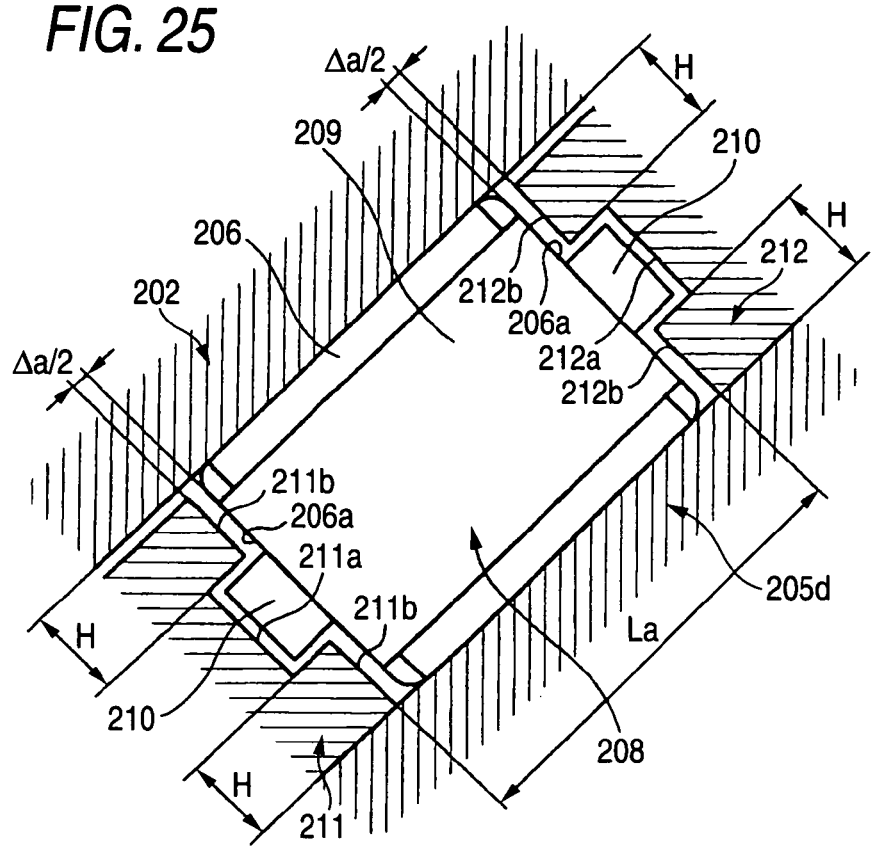
FIG. 25 is an enlarged view of a portion E in FIG. 24.
Figure 26:
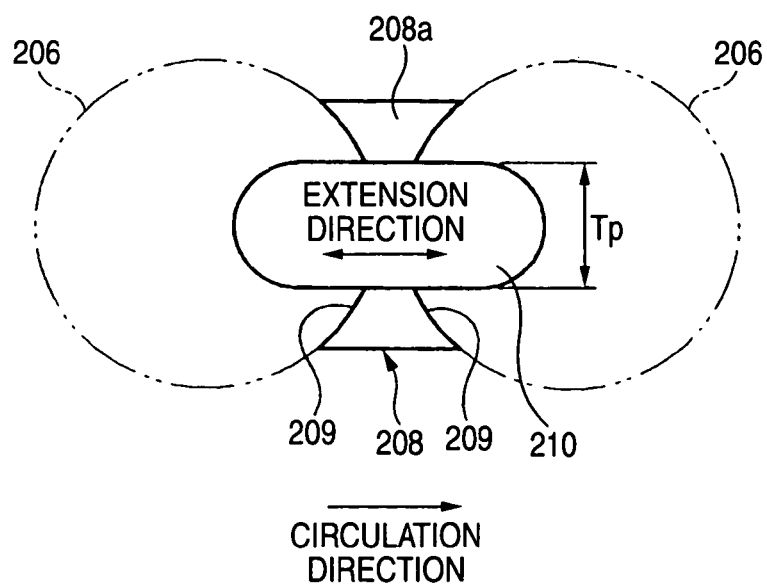
FIG. 26 is a side elevational view illustrating the separator in accordance with the third embodiment of the invention.
Figure 27:
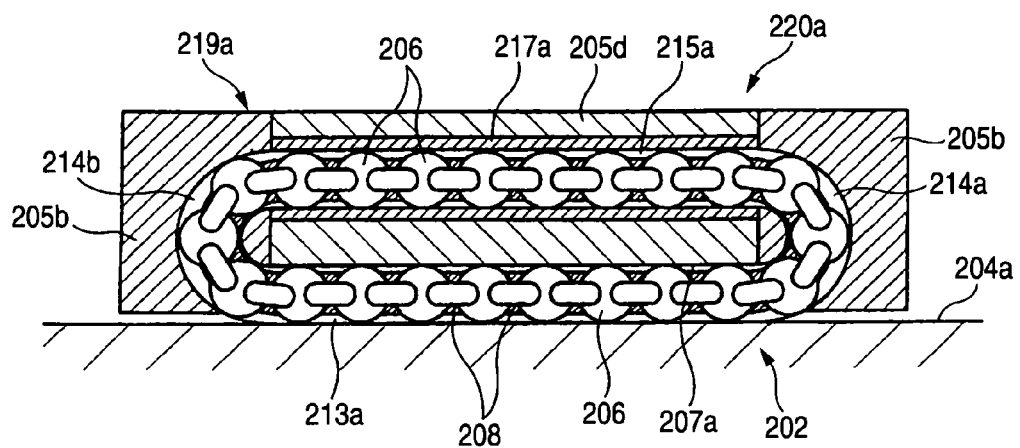
FIG. 27 is an explanatory diagram illustrating a circulation passage in accordance with the third embodiment of the invention.

FIG. 23 is a perspective view illustrating the linear guide apparatus in accordance with the embodiment. FIG. 24 is a right side half cross-sectional view taken along line XXIV-XXIV in FIG. 23. FIG. 25 is an enlarged view of a portion E in FIG. 24. FIG. 26 is a side elevational view illustrating the separator in accordance with the embodiment. FIG. 27 is an explanatory diagram illustrating the circulation passage in accordance with the embodiment.

In FIG. 23, reference numeral 201 denotes a linear guide apparatus.

Reference numeral 202 denotes a guide rail of the linear guide apparatus 201, which is an elongated bar-shaped member fabricated from a steel product such as an alloy steel and having a substantially I-shaped cross-sectional shape. A plurality of stepped bolt holes 203 for fixing the guide rail 202 to such as a base of a precision machine are provided in its upper surface 202a at predetermined pitches.

Reference numeral 204 denotes a recessed portion which is a substantially V-shaped groove having a pair of rail raceway surfaces 204a and 204b which are formed along the longitudinal direction of each side surface of the guide rail 202.

Reference numeral 205 denotes a slider which is made up of a slider body 205a and a pair of end caps 205b which are respectively disposed at both longitudinal ends in its moving direction.

The slider body 205a is a saddle-like member fabricated from a steel product such as an alloy steel and having a substantially U-shaped cross-sectional shape. Threaded holes 205c are provided in its upper surface, and this slider body 205 is fastened to a moving base or the like of a machine tool by using these threaded holes 205c by means of bolts or the like.

Each end cap 205b is fabricated from a metal material or a resin material or the like, and is fastened to the slider body 205a by bolts or the like.

In FIGS. 24 and 25, reference numeral 206 denotes a roller serving as a rolling element, which is fabricated by forming a steel product such as an alloy steel into a cylindrical shape.

Reference numerals 207a and 207b denote a pair of slider raceway surfaces, which are provided on the inner side of each side wall 205d of the slider body 205a of the slider 205 in such a manner as to oppose the rail raceway surfaces 204a and 204b, respectively.

Reference numeral 208 denotes a separator which is fabricated from a resin material or the like. As shown in FIG. 26, the separator 208 has formed thereon a pair of roller retaining holes 209 which are formed by concaving front and rear side surfaces, as viewed in a circulation direction, into a circular arc shape in rear arrangement with a larger shape than the external shape of the roller 206, so as to retain the roller 206, as well as a pair of arm portions 210 which are disposed on both axial sides of the roller 206 and extend in the circulation direction in face-to-face relation to side surfaces 206a, respectively (the direction in which the arm portion 210 extends will be referred to as an extension direction).

In addition, the front and rear ends in the extension direction of the arm portion 210 are formed in substantially semicircular arc shapes for making smooth the movement to guide grooves 216 of a direction changing passage 214a, which will be described later.

Reference numeral 211 denotes a retainer serving as a retaining member, which is fabricated from a metal material or a resin material or the like. As shown in FIG. 25, this retainer 211 is provided with a guide groove 211a for guiding one arm portion 210 of each separator 208 which moves in the circulation direction together with the rollers 206 which roll on the rail raceway surface 204a and the slider raceway surface 207a. A guide surface 211b is formed on each side of this guide groove 211a.

Reference numeral 212 denotes a retainer serving as a retaining member, which is fabricated from a metal material or a resin material or the like. As shown in FIG. 25, this retainer 212 has formed thereon a guide surface 212b which opposes the guide surface 211b of the retainer 211 with the roller 206 placed therebetween. A guide groove 212a for guiding the other arm portion 210 is also formed in the same way as the retainer 211.

The aforementioned retainer 211 and retainer 212 are respectively positioned and retained so as to maintain perpendicularity between the respective guide surfaces 211b and 212b and the slider raceway surface 207a through unillustrated recessed portions and projecting portions provided at the joint portions with the end caps 205b on both sides.

Thus, the retainer 211 and the retainer 212 are disposed on both sides in the circulation direction of the slider raceway surface 207a, and the rollers 206 having the separators 208 interposed therebetween are charged between the rail raceway surface 204a and the slider raceway surface 207a and between the guide surfaces 211b and 212b. A load passage 213b for reciprocatably supporting the load applied to a movable body is thereby formed.

In addition, the arm portions 210 of the separators 208 which move together with the rollers 206 which roll on the load passage 213a are guided by the guide grooves 211a and 212a of the retainer 211 and the retainer 212, and the side surfaces 206a of the rollers 206 which roll are retained by the guide surfaces 211b and 212b to prevent them from falling off.

Figure 28:
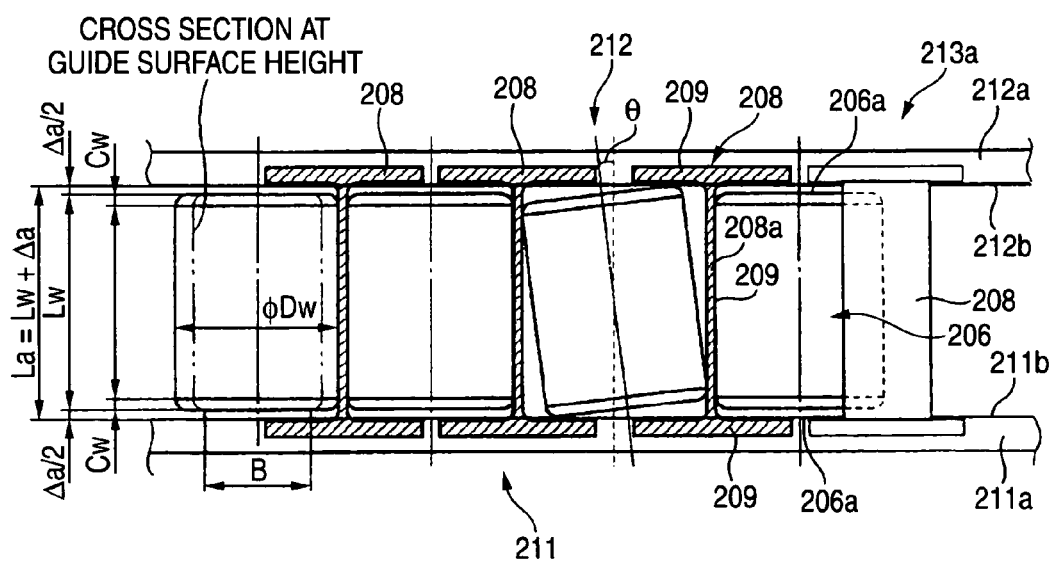
FIG. 28 is an explanatory diagram illustrating a rolling state of the rollers in accordance with the third embodiment of the invention.

In FIG. 27, reference numerals 214a and 214b denote direction changing passages provided in the end caps 205b on both sides, and the direction changing passages 214a and 214b are curved passages having substantially rectangular cross sections for connecting the load passage 213a and a return passage 215a. The curved guide grooves 216 for guiding the arm portions 210 of the separator 208 shown by the broken lines in FIG. 28 are formed therein, and have the function for changing the circulation direction by guiding the rollers 206 and the separators 208.

It should be noted that the direction changing passage for connecting the load passage 213b and the return passage 215b is similarly provided in the end cap 205b, and is formed in the form of an overhead crossing to avoid an intersection with each of the direction changing passages 214a and 214b.

Figure 32:
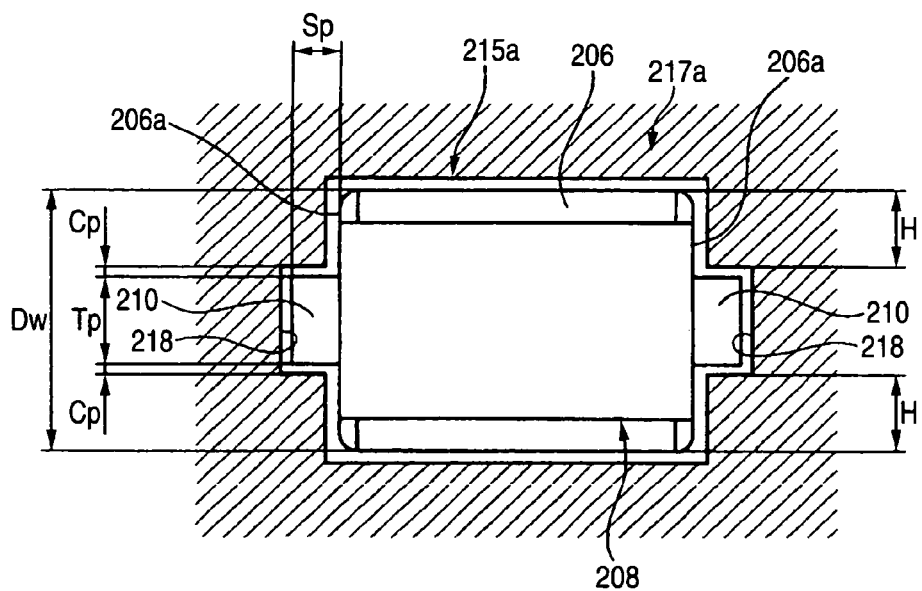
FIG. 32 is a cross-sectional view illustrating a return passage in accordance with the third embodiment of the invention.

The return passages 215a and 215b are respectively formed in cylindrical holders 217a and 217b, which are formed of resin material and are fitted in through holes provided in the both side walls 205d of the slider body 205a of the slider 205, as through holes of rectangular cross sections having guide grooves 218, as shown in FIG. 32. The return passages 215a and 215b guide the rollers 206 and the separators 208 which roll inside them to thereby circulate the rollers 206 and the like.

Unillustrated recessed portions and projecting portions are provided at the joint portions with the end caps 205b at both ends of the holders 217a and 217b, and are positioned and retained such that the return passages 215a and 215b assume rectangular cross sections by being inclined at predetermined angles.

A connecting passage 219a is formed inside the slider 205 by the direction changing passage 214a, the return passage 215a, and the direction changing passage 214b, and this connects the end portions on both sides of the load passage 213a to thereby form a circulation passage 220a.

In a case where the rollers 206 are charged in the circulation passage (e.g., the circulation passage 220a), the rollers 206 and the separators 208 are alternately charged, as shown in FIG. 27. A predetermined amount of a lubricant, e.g., grease, is sealed therein, thereby charging the plurality of rollers 206 in the circulation passage 220a.

At this time, the arm portion 210 of the separator 208 is fitted in the guide groove 212a of the retainer 211, the guide groove 211a of the retainer 212, the guide grooves 216 of the direction changing passages 214a and 214b, and the guide groove 218 of the return passage 215a, which are provided in the circulation passage 220a, and its movement in the circulation direction is thereby guided.

In addition, the roller 206 is fitted in the retaining holes 209 of the separators 208 on both sides to have its circumferential direction retained by the roller retaining holes 209, and its side surfaces 206a are guided by the guide surfaces 211b and the like formed on both sides of the respective guide grooves provided in the circulation passage 230a.

As a result, each separator 208 is interposed between the adjacent rollers 206, and the mutual contact between the rollers 206 can be prevented by a wall portion (referred to as an adjoining portion) 208a for adjoining the rollers 206 respectively fitted in the pair of roller retaining holes 209 in rear arrangement.

The above-described circulation passage is similarly formed also in the other circulation passage 220b and in the sidewall 205b on the opposite side, and the slider 205 is thereby supported by the guide rail 202 linearly reciprocatably.

A description will be given of the operation of the above-described construction by citing the circulation passage 220a as an example.

It should be noted that the same applies to the other circulation passage 220b and the side wall 205b on the opposite side as well.

FIG. 28 is an explanatory diagram illustrating a rolling state of the rollers in accordance with the embodiment, illustrates the state of the rollers 206 which roll on the load passage 213a of the circulation passage 220a, and illustrates a state in which the skew has occurred in one of the rollers 206.

Reference character Dw shown in FIG. 28 denotes the diameter of the roller 206, Lw denotes the axial length of the roller 206, and Cw denotes the length of a chamfer or a fillet R (referred to as the chamfer length) at a corner between the side surface 206a of the roller 206 and the rolling surface (circumferential surface) of the roller 206.

In addition, reference character H shown in FIG. 25 denotes the height (referred to as the guide surface height) of the guide surfaces 211b and 212b measured in a perpendicular direction from the slider raceway surface 207a, and La denotes a distance (referred to as the distance between the guide surfaces) between the guide surface 211b and the guide surface 212b.

Figure 29:
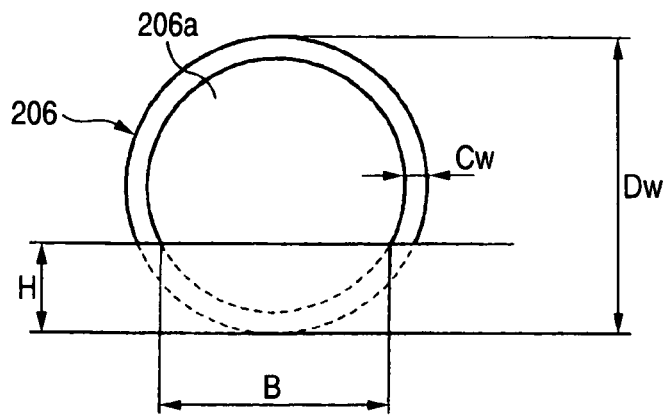
FIG. 29 is an explanatory diagram illustrating a maximum contact length in accordance with the third embodiment of the invention.

Reference character B denotes a maximum contact length between the side surface 206a of the roller 206 shown in FIG. 29 and each of the guide surfaces 211b and 212b, and the maximum contact length B is a maximum value of the contact length when the side surface 206a of the roller 206 comes into contact with each of the guide surfaces 211b and 212b, and can be calculated geometrically by the following formula:

$$B=2((Dw/2-Cw)^2-(Dw/2-H)^2)^{0.5} \quad (1)$$

Reference character $\Delta a$ denotes a clearance in the axial direction of the roller, is a difference between the distance between the guide surfaces and the axial length of the roller 206, and can be obtained from $$\Delta a=La-Lw \quad (2)$$

In such a circulation passage 220a, a maximum skew angle θ in the case where a skew has occurred, as shown in FIG. 28, and the roller 206 has abutted against the guide surface 211b or 212b can be approximately obtained from $$\theta=\Delta a/B \text{ [radian]} \quad (3)$$

Figure 30:
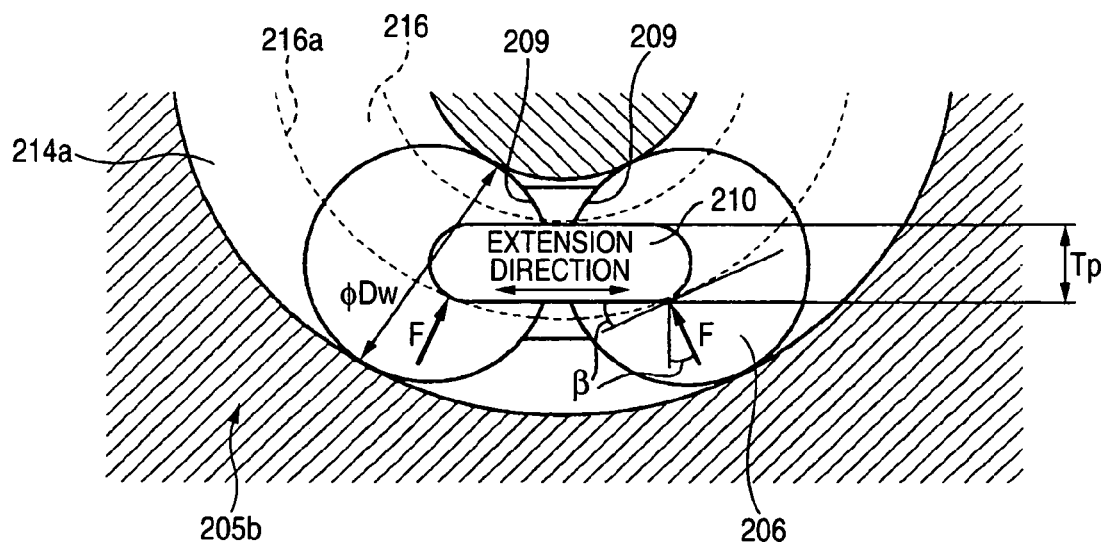
FIG. 30 is an explanatory diagram illustrating a direction changing passage in accordance with the third embodiment of the invention.
Figure 31:
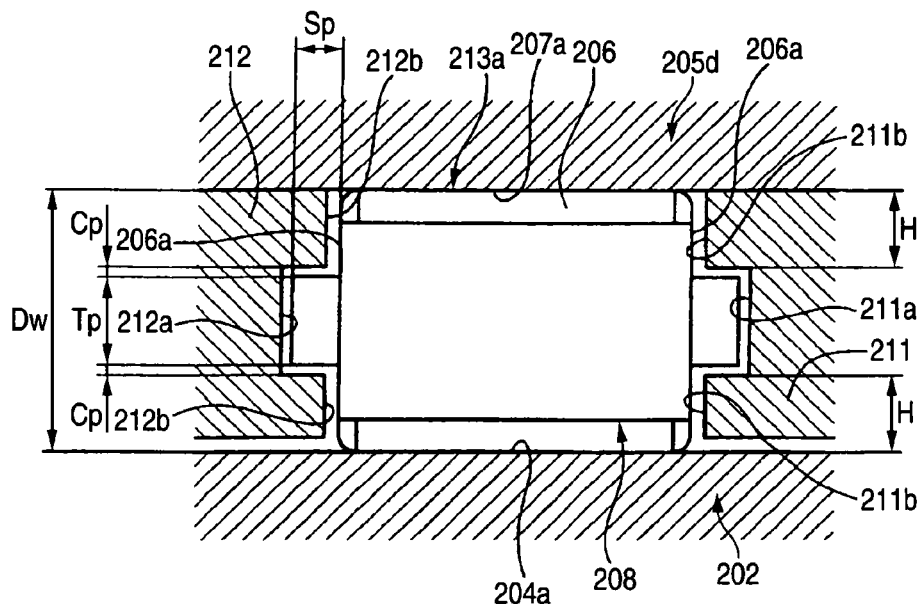
FIG. 31 is a cross-sectional view illustrating a load passage in accordance with the third embodiment of the invention.

Next, referring to FIG. 30, a description will be given of a maximum stress σ occurring in the arm portion 210 of the separator 208 which moves in the direction changing passage 214a of the circulation passage 220a.

If it is assumed that the force of action which is received from the guide wall 16a by the arm portion 210 which is brought into sliding contact with the outer guide wall 16a of the guide groove 216 of the direction changing passage 214a curved in the circular arc shape is F, the maximum stress σ occurring in the arm portion 210 can be approximately obtained by the following formula:

$$\sigma=3Dw \cdot F \sin \beta/(Sp \cdot Tp^2) \quad (4)$$

Here, β denotes an angle (referred to as the angle of action) which is formed by the extension direction of the arm portion 210 and a tangential direction at a point of sliding contact of the arm portion 210 with respect to the guide wall 216b, Tp denotes the thickness (referred to as the vertical thickness) of the load passage arm portion 210 in the vertical direction of the slider raceway surface 207a, and Sp denotes the thickness (referred to as the axial thickness) of the arm portion 210 in the axial direction of the roller 206.

In addition, Cp denotes a one-side clearance between the vertical thickness Tp of the arm portion 210 and the guide wall on either side of the guide groove 211a or 212a of the load passage 213a, and the one-side clearance Cp is in the following relationship:

$$Dw=2H+2Cp+Tp \quad (5)$$

The same also applies to the return passage 215a shown in FIG. 32.

Figure 33:
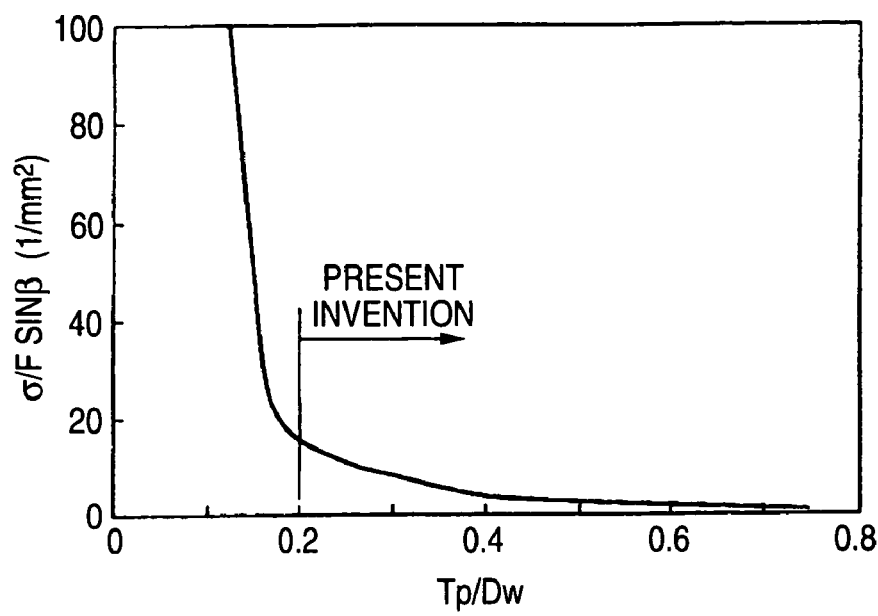
FIG. 33 is a graph illustrating a maximum stress $\sigma$ with respect to a thickness-diameter ratio Tp/Dw in accordance with the invention.
Figure 34:
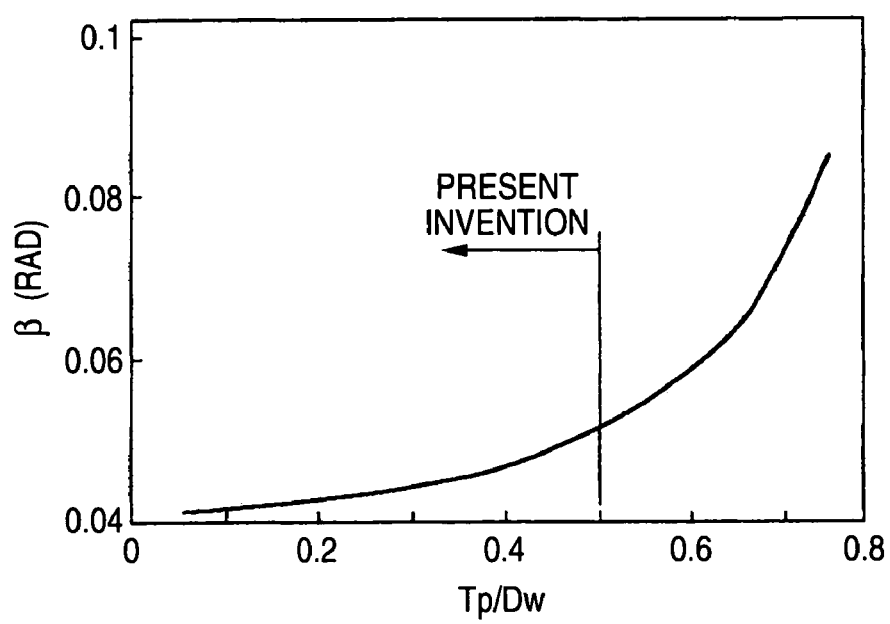
FIG. 34 is a graph illustrating a maximum skew angle $\theta$ with respect to a thickness-diameter ratio Tp/Dw in accordance with the invention.

The maximum stress σ and the skew angle θ when the aforementioned vertical thickness Tp was varied is shown in FIGS. 33 and 34.

The number of the roller rows of the linear guide apparatus 210 used in this case was four, and the following settings were made: The diameter Dw of the roller 206=5.5 mm; the axial length Lw of the roller 206=8 mm; chamfer length Cw=0.3 mm; the distance La between the guide surfaces=8.2 mm (the clearance $\Delta a$ in the axial direction of the roller=0.2 mm); the axial thickness Sp of the arm portion 210=0.8 mm; and the one-side clearance Cp=0.1 mm.

It should be noted that the guide surface height H can be obtained by using the formula (5) as $$H=(Dw-2Cp-Tp)/2 \quad (5a)$$

The guide surface height H was varied in accordance with a change in the vertical thickness Tp of the arm portion 210.

As shown in FIG. 33, if the ratio (referred to as the thickness-diameter ratio Tp/Dw) between the vertical thickness Tp of the arm portion 210 and the diameter Dw of the roller 206, which was used as an index, is not less than 0.2, it is possible to effectively reduce the maximum stress σ.

Furthermore, as shown in FIG. 34, if the thickness-diameter ratio Tp/Dw is set to not more than 0.5, it is possible to effectively suppress the skew angle θ of the roller 206.

As described above, in this embodiment, the separator interposed between the rollers is provided with the pair of arm portions, each of these arm portions is guided by the guide groove provided on either side of the circulation passage, the side surface of the roller is guided by the guide surface on each side of the guide groove, and the thickness-diameter ratio Tp/Dw is set in the range of $0.2 \leq Tp/Dw \leq 0.5$. Accordingly, when a skew has occurred, the skew angle is restricted by the guide surfaces on both sides, and the occurrence of movement of the separator is eliminated, making it possible to prevent an excess skew angle. At the same time, it is possible to prevent an increase in the movement resistance of the slider even in the linear guide apparatus in which the separators are respectively interposed between the rollers.

In addition, since the thickness-diameter ratio Tp/Dw is set in the range of $Tp/Dw \leq 0.5$, it is possible to make appropriate the skew angle when the skew has occurred in the roller, making it possible to prevent wear due to sliding friction. Further, since the thickness-diameter ratio Tp/Dw is set in the range of $0.2 \leq Tp/Dw$, it is possible to prevent damage of the arm portions of the separators, thereby making it possible to improve the service life of the linear guide apparatus.

Fourth Embodiment

Hereafter, referring to the drawings, a description will be given of the linear guide apparatus in accordance with a fourth embodiment of the invention.

Figure 35:
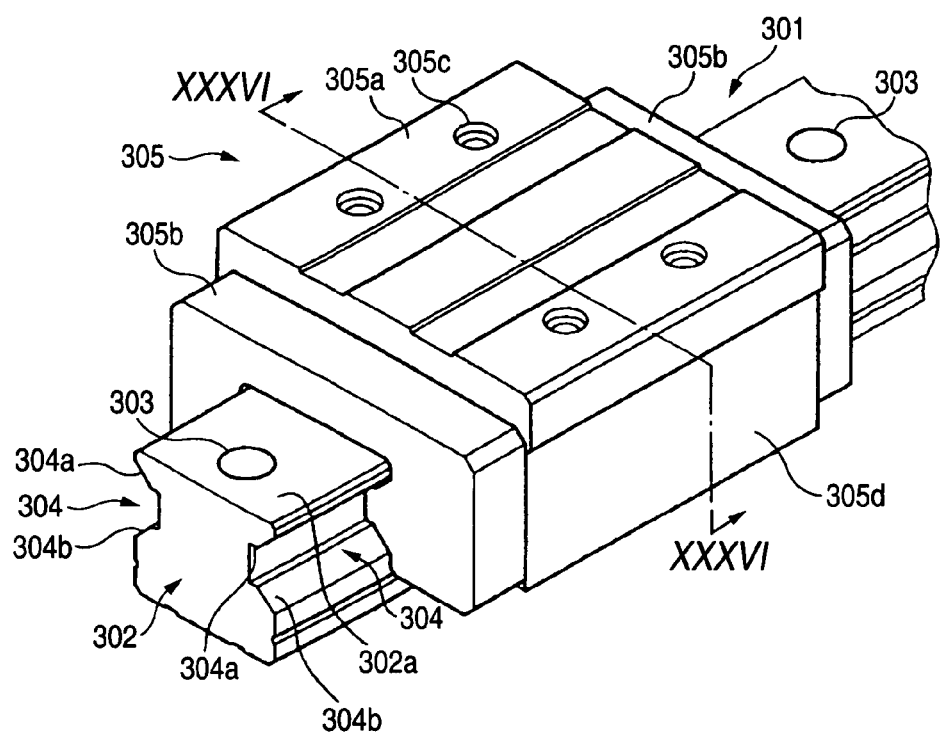
FIG. 35 is a perspective view illustrating a linear guide apparatus in accordance with a fourth embodiment of the invention.
Figure 36:
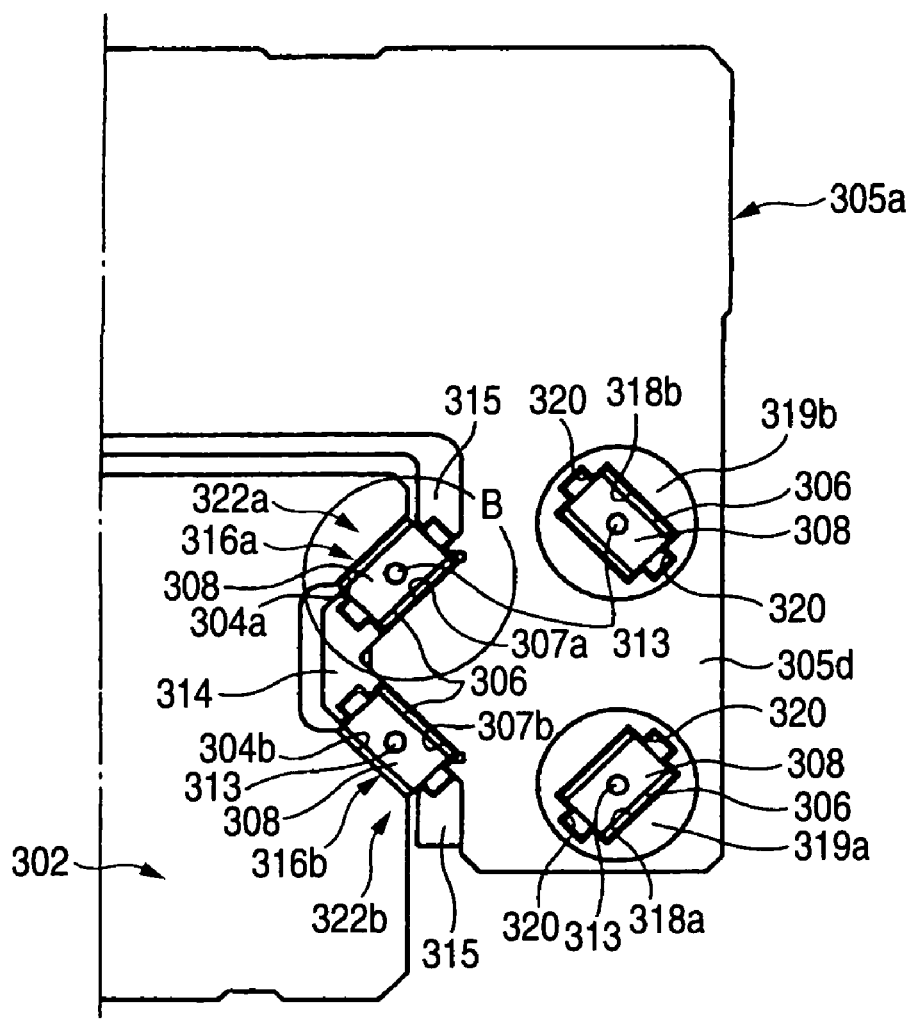
FIG. 36 is a right side half cross-sectional view taken along line XXXVI-XXXVI in FIG. 35.
Figure 37:
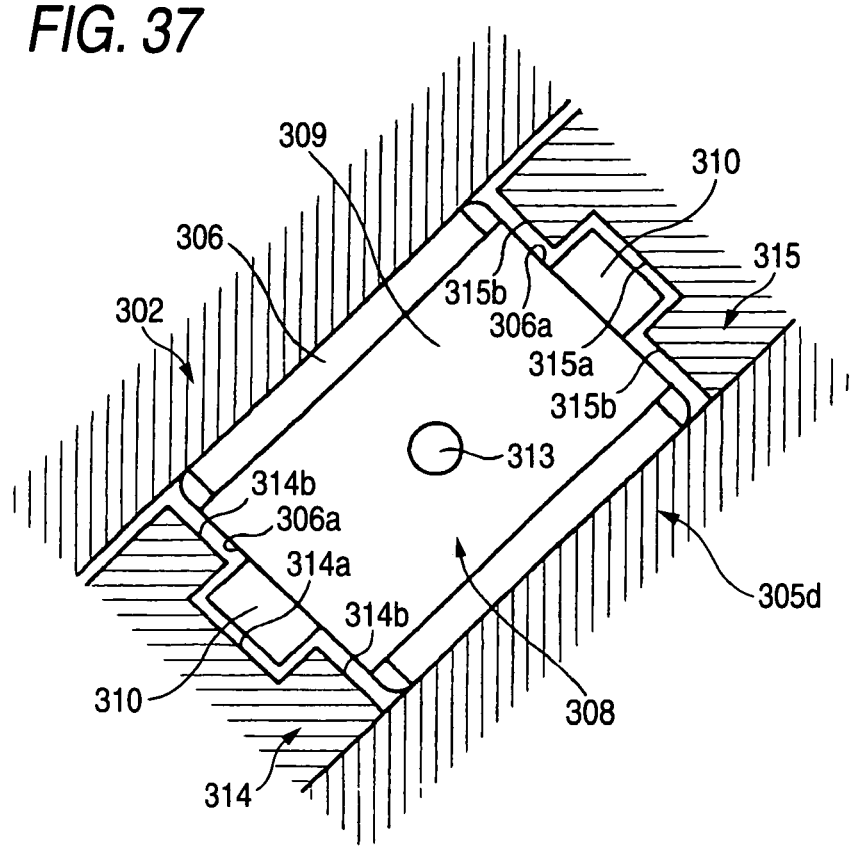
FIG. 37 is an enlarged view of a portion B in FIG. 36.
Figure 38:
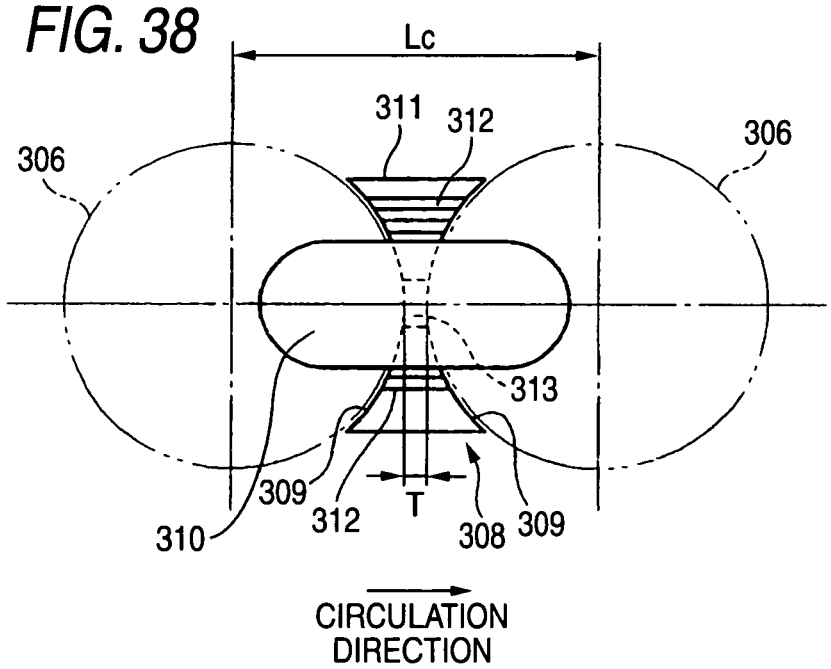
FIG. 38 is a side elevational view illustrating the separator in accordance with the fourth embodiment of the invention.
Figure 39:
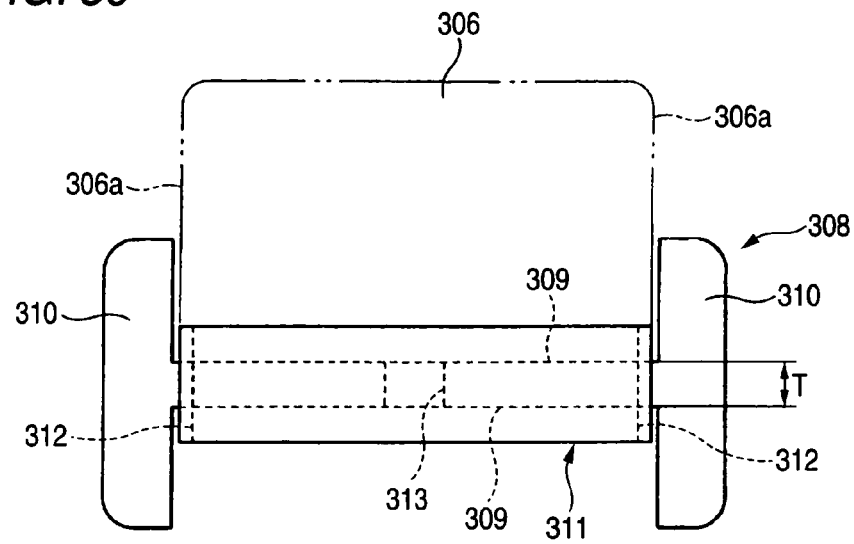
FIG. 39 is a top view illustrating the separator in accordance with the fourth embodiment of the invention.
Figure 40:
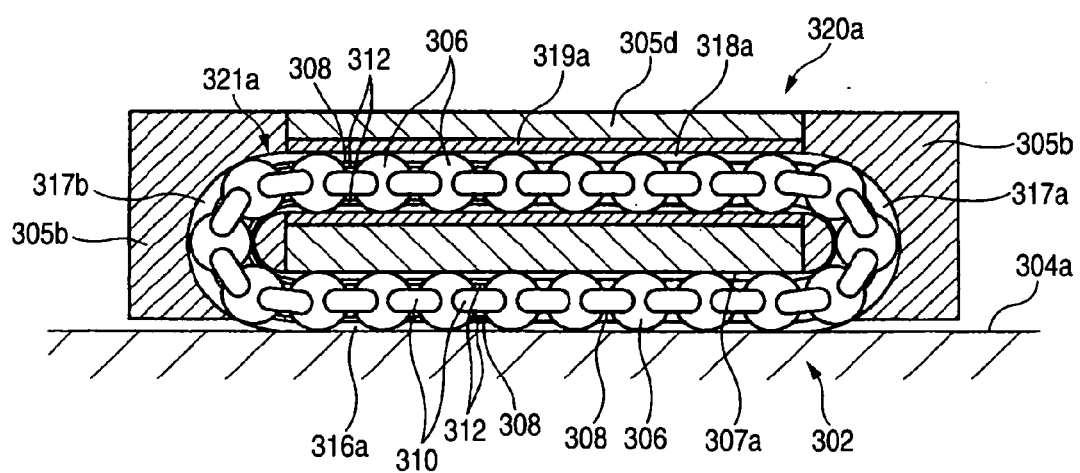
FIG. 40 is an explanatory diagram illustrating the circulation passage in accordance with the embodiment of the invention.

FIG. 35 is a perspective view illustrating the linear guide apparatus in accordance with the embodiment. FIG. 36 is a right side half cross-sectional view taken along line XXXVI-XXXVI in FIG. 35. FIG. 37 is an enlarged view of a portion B in FIG. 36. FIG. 38 is a side elevational view illustrating the separator in accordance with the embodiment. FIG. 39 is a top view illustrating the separator in accordance with the invention. FIG. 40 is an explanatory diagram illustrating the circulation passage in accordance with the embodiment.

In FIG. 35, reference numeral 301 denotes a linear guide apparatus.

Reference numeral 302 denotes the guide rail of the linear guide apparatus 301, which is an elongated bar-shaped member fabricated from a steel product such as an alloy steel and having a substantially I-shaped cross-sectional shape. A plurality of stepped bolt holes 303 for fixing the guide rail 302 to such as a base of a precision machine are provided in its upper surface 302a at predetermined pitches.

Reference numeral 304 denotes a raceway recessed portion which is a substantially V-shaped groove having a pair of rail raceway surfaces 304a and 304b which are formed along the longitudinal direction of each side surface of the guide rail 302.

Reference numeral 305 denotes the slider, which is made up of a body 305a and a pair of end caps 305b which are respectively disposed at both longitudinal ends in its moving direction.

The body 305a is a saddle-like member fabricated from a steel product such as alloy steel and having a substantially U-shaped cross-sectional shape. Threaded holes 305c are provided in its upper surface, and this body 305 is fastened to a moving base or the like of a machine tool by using these threaded holes 305c by means of bolts or the like.

Each end cap 305b is fabricated from metal material or resin material or the like, and is fastened to the body 305a by bolts or the like.

In FIGS. 36 and 37, reference numeral 306 denotes the roller serving as the rolling element, which is fabricated by forming a steel product such as alloy steel into a cylindrical shape.

Reference numerals 307a and 307b denote a pair of slider raceway surfaces, which are provided on the inner side of each side wall 305d of the body 305a of the slider 305 in such a manner as to oppose the rail raceway surfaces 304a and 304b, respectively.

Reference numeral 308 denotes the separator which is fabricated from resin material or the like. As shown in FIGS. 38 and 39, the separator 308 has formed thereon a pair of roller retaining holes 309 and a pair of arm portions 310. The pair of the roller retaining holes 309 are formed by concaving front and rear sides thereof as viewed in the circulation direction, into a circular arc shape in rear arrangement with a larger shape than the external shape of the roller 306, so as to retain the roller 306, shown by the two-dot chain lines. The pair of the arm portions 310 are disposed on both axial sides of the roller 306 and extend in the circulation direction in face-to-face relation to side surfaces 306a, respectively.

In addition, the front and rear ends of the arm portion 310 are formed in substantially semicircular arc shapes for making smooth the movement in the guide grooves of a direction changing passage 314a, which will be described later.

Reference numeral 311 denotes the adjoining portion of the separator 308, which is a wall for separating the pair of roller contact surfaces 309 in rear arrangement. Minimum thickness T (referred to as adjoining thicknesses T) are defined between the adjoining portions 311, with which the rollers 306 on both sides abut, when the rollers 306 are respectively retained at the roller contact surfaces 309 on both sides and are adjoined with the adjoining portion 311 interposed therebetween. The minimum thickness T are set pluralities of values. As a result, it becomes possible to set a plurality of distances Lc between centers of the rollers 306.

Reference numeral 312 denotes an identification mark, which is a mark for indicating the distinction in the adjoining thickness T of the separator 308. The identification mark 312 is provided as recesses or projections on one or both of the side surfaces of the adjoining portion 311 in the axial direction of the roller 306, and is formed in such a size as to allow an operator of such as the assembly operation or the inspection operation to discriminate it by visual observation.

In this embodiment, the identification mark 312 is provided on both side surfaces as grooves which are recesses extending along the extension direction of the arm portion 310, and the identification mark 312 expresses the distinction in the adjoining thickness T by the number of these grooves.

It should be noted that the identification mark 312 is not limited to the above, and may be a figure or a code of such as a triangular shape, a round shape, or a rectangular shape, or the alphabet or characters such as hiragana, katakana (Japanese characters), or numerical figures.

In addition, one of the plurality of identification marks 312 may be unmarked to express the distinction in the adjoining thickness T, so as to indicate the difference from the others.

Reference numeral 13 denotes an oil reservoir hole provided in the adjoining portion 311, and the oil reservoir hole 313 is provided in such a manner as to penetrate the central portion, as viewed in the axial direction of the roller 306, of the adjoining portion 311 in the vicinity of the adjoining thickness T, so as to allow a lubricant to be retained therein and supply the lubricant to the roller 306 when the roller 306 rolls while being retained by the roller contact surface 309.

It should be noted that since the oil reservoir hole 313 is a hole which penetrates a portion with the adjoining thickness T, the distance Lc between centers of the adjacent rollers 306 with the adjoining portion 311 interposed therebetween does not change by the presence of the oil reservoir hole 313.

Reference numeral 14 denotes the retainer which is fabricated from metal material or resin material or the like. As shown in FIG. 37, this retainer 314 is provided with a guide groove 314a for guiding one arm portion 310 of each separator 308 which moves in the circulation direction together with the rollers 306 which roll on the rail raceway surface 304a and the slider raceway surface 307a. A guide surface 314b is formed on each side of this guide groove 314a.

Reference numeral 315 denotes the retainer which is fabricated from a metal material or a resin material or the like. This retainer 315 has formed thereon a guide surface 315b which opposes the guide surface 314b of the retainer 314 with the roller 306 placed therebetween. A guide groove 315a for guiding the other arm portion 310 is also formed in the same way as the retainer 314.

Each of the retainers 315 of this embodiment is disposed at a position opposing to the retainer 314 with the roller 306 which is placed therebetween, and the retainer 315 disposed on a flank side of the saddle-like slider 305 is composed of a total of three parts by integrally forming portions disposed between the wall portions 305d on both sides.

The aforementioned retainer 314 and retainer 315 are respectively positioned and retained so as to maintain perpendicularity between the respective guide surfaces 314b and 315b and the slider raceway surface 207a through unillustrated recessed portions and projecting portions provided at the joint portions with the end caps 305b on both sides.

Thus, the retainer 314 and the retainer 315 are disposed on both sides in the circulation direction of the slider raceway surface 307a, and the rollers 306 having the separators 308 interposed therebetween are loaded between the rail raceway surface 304a and the slider raceway surface 307a and between the guide surfaces 314b and 315b. A load passage 313b for reciprocatably supporting the load applied to a movable body is thereby formed.

In addition, the guide grooves 314a, 315a of the retainer 314, 315 guide the arm portions 310 of the separators 308, which move together with the rollers 306 rolling in the load passage 316a. In addition, the guide grooves 314a, 315a hold the side surfaces 306a of the roller 306 which rolls along the guide surface 314b, 315b so as to prevent them from falling off.

In FIG. 40, reference numerals 317a and 317b denote the direction changing passages provided in the end caps 305b on both sides, and the direction changing passages 317a and 317b are curved passages having substantially rectangular cross sections for connecting the load passage 316a and a return passage 318a. Unillustrated curved guide grooves for guiding the arm portions 310 of the separators 308 are formed therein, and have the function for changing the circulation direction by guiding the rollers 306 and the separators 308.

It should be noted that the direction changing passage for connecting the load passage 316b and the return passage 318b is similarly provided in the end cap 305b, and is formed in the form of an overhead crossing to avoid an intersection with each of the direction changing passages 317a and 317b.

The return passages 318a and 318b are respectively formed in cylindrical holders 319a and 319b, which are formed of resin material and are fitted in through holes provided in the both side walls 305d of the body 305a of the slider 305, as through holes of rectangular cross sections having guide grooves 320, as shown in FIG. 36. The return passages 318a and 318b guide the rollers 306 and the separators 308, which rolling inside them, to thereby circulate the rollers 306 and the like.

Unillustrated recessed portions and projecting portions are provided at the joint portions with the end caps 305b at both ends of the holders 319a and 319b, and are positioned and retained such that the return passages 318a and 318b assume rectangular cross sections by being inclined at predetermined angles.

A connecting passage 321a is formed inside the slider 305 by the direction changing passage 317a, the return passage 318a, and the direction changing passage 317b, and this connects the end portions on both sides of the load passage 316a to thereby form a circulation passage 322a.

In a case where the rollers 306 are charged in the circulation passage 322a, for example, the rollers 306 and the separators 308 are alternately charged, as shown in FIG. 40, and a predetermined amount of a lubricant, e.g., grease, is sealed therein, thereby charging the plurality of rollers 306 in the circulation passage 322a.

At this time, the arm portion 310 of the separator 308 is fitted in the guide groove 315a of the retainer 314, the guide groove 317a of the retainer 315, the unillustrated guide grooves of the direction changing passages 317a and 317b, and the guide groove 320 of the return passage 318a, which are provided in the circulation passage 322a, and its movement in the circulation direction is thereby guided.

The above-described circulation passage is similarly formed also in the other circulation passage 322b and in the sidewall 305b on the opposite side, and the slider 305 is thereby supported by the guide rail 302 linearly reciprocatably.

A description will be given of the operation of the above-described construction by citing the circulation passage 322a as an example.

It should be noted that the same applies to the other circulation passage 322b and the side wall 305d on the opposite side as well.

As shown in FIG. 40, the rollers 306 and the separators 308 are alternately charged in the circulation passage 322a, and each roller 306 is fitted onto the roller contact surfaces 309 of the separators 308 on its both sides to have its circumferential direction retained by the roller contact surfaces 309. At the same time, its side surface 306a is guided by the guide surfaces 314b and 315b and the like formed on both sides of the respective guide grooves such as the guide grooves 314a and 315a provided in the circulation passage 322a.

As a result, each separator 308 is interposed between the adjacent rollers 306, and the rollers 306 each retained by the pair of roller contact surfaces 309 in rear arrangement are spaced apart by the adjoining portion 311 of the separator 308, so as to prevent the mutual contact between the rollers 306.

At this time, to set the circulation direction clearance in a proper range, in this embodiment, as shown in FIG. 40, one kind of separators 308 whose identification marks 312 are unmarked and another kind of separators 308 each provided with a two-line identification mark 312 and having two different adjoining thicknesses T are used. Namely, by using two kinds of separators 308, the respective separators 308 in a number, which is predetermined in accordance with the diameter of the rollers 306 and the length of the circulation passage 322a, are discriminated by the identification marks 312 and are interposed between the rollers 306, and are thereby loaded in the circulation passage 322a.

For example, in a case where the circulation passage length of the circulation passage 322a is 289.5 mm, to set the proper circulation direction clearance to 0.5 mm, if the rollers 306 and the two kinds of separators 308 to be charged are set such that numbers of rollers 306 having a 5 mm diameter is set 50, numbers of separators 308 having an adjoining thickness T of 0.8 mm (the distance Lc between centers of the rollers 306=5.8 mm) is set 30, and numbers of separators 308 having an adjoining thickness T of 0.75 mm (the distance Lc between centers of the rollers 306=5.75 mm) is set 20, then the circulation direction clearance becomes 289.5−30×5.8−20×5.75=0.5. Thus, it is possible to set a proper circulation direction clearance by the two kinds of separators 308.

By using this as a reference value of design, in a case where the circulation direction clearance after assembly has changed due to allowances which are set for the direction changing passages 317a and 317b, the body 305a of the slider 305, and the like, and in a case where the circulation passage length after assembly has become elongated and assumed 289.7, the combination of the two kinds of separators 308 charged is changed to make the length formed by the rollers and the separators 308 (referred to as the roller row length) longer.

Namely, if the circulation direction clearance is 0.7 mm after charging in the circulation passage 322a of 30 numbers of separators 308 having the adjoining thickness T of 0.8 mm and 20 numbers of separators 308 having the adjoining thickness T of 0.75 mm together with the rollers 306, since the circulation direction clearance is 0.2 mm longer than the proper the circulation direction clearance. Therefore, to increase the roller row length, the assembly operator removes four separators 308 having the adjoining thickness T of 0.75 mm by identifying them by the identification marks 312, and replaces them with the separators 308 having the adjoining thickness T of 0.8 mm.

In consequence, the roller row length becomes 0.2 mm longer, and the circulation direction clearance can be set to the proper 0.5 mm. In addition, by virtue of the identification marks 312 an inspection operator is able to visually confirm that four more separators 308 having the adjoining thickness T of 0.8 mm are charged in comparison with the standard, and is able to immediately check whether proper assembly has been performed by referring to an assembly operation table or the like.

It should be noted that in a case where the circulation passage length after assembly has become short, if a required number of separators 308 having the adjoining thickness T of 0.8 mm are removed and are replaced with the separators 308 having the adjoining thickness T of 0.75 mm, the circulation direction clearance can be set properly in the same way as described above.

In addition, in the linear guide apparatus 301, preload is generally imparted in the load passage 316a to stabilize the movement of the slider 305.

For example, in a case where the distance between raceway surfaces, i.e., between the rail raceway surface 304a of the guide rail 302 and the slider raceway surface 307a of the slider 305, has become slightly larger due to allowances, and it is necessary to use the rollers 306 having a diameter of 5.005 mm in order to obtain a proper preload, since the roller row length becomes 0.25 mm longer than the design reference value, 5 separators 308 having the adjoining thickness T of 0.8 mm are removed and are replaced with the separators 308 having the adjoining thickness T of 0.75 mm, so as to shorten the roller row length.

As a result, the roller row length becomes 0.25 mm shorter, and the circulation direction clearance can be set to the proper 0.5 mm. In addition, by virtue of the identification marks 312 the inspection operator is able to visually confirm that five more separators 308 having the adjoining thickness T of 0.75 mm are charged in comparison with the standard, and is able to immediately check whether proper assembly has been performed by referring to the assembly operation table or the like.

It should be noted that in a case where the circulation passage length after assembly is slightly shorter, if a required number of separators 308 having the adjoining thickness T of 0.75 mm are removed and are replaced with the separators 308 having the adjoining thickness T of 0.8 mm, the circulation direction clearance can be set properly in the same way as described above.

Thus, if the design reference dimensions are set by combining two kinds of separators 308 having different adjoining thicknesses T, the circulation direction length can be set properly in any cases.

Although the above description has been given by citing numerals to facilitate an understanding, the applicable range of the invention is not limited by the aforementioned dimensions and numbers of pieces. Also, the invention can be applied to the circulation passage 322a of any length, the rollers 306 of any diameter, and any adjoining thicknesses T if a measure is adopted as described above. In short, it suffices if the invention is applied by properly combining the numbers of two kinds of separators 308 determining the design reference values so as to set the circulation direction clearance in a proper range.

In this case, the invention can be applied if the kinds of the separators 308 having different adjoining thicknesses T are two or more. However, if consideration is given to the number of molds for fabricating the separators 308, the complexities of management of the separators 308, and the like, the number of kinds is preferably set to two.

It should be noted that the foregoing description has been given that the assembly operator replaces an appropriate number of separators 308 by measuring the circulation direction clearance after assembly. However, the measurement of the circulation direction clearance by the assembly operator may be omitted by measuring the circulation passage length in advance and by performing the assembly operation in accordance with an assembly instruction sheet or the like which designates the combination of the number of separators 308 to be assembled. This makes it possible to attain efficiency in the assembly operation.

In addition, although in this embodiment it has been described that the identification of the separators 308 having different adjoining thicknesses T is effected by the identification marks 312, the identification marks 312 may, for example, be omitted, and the difference in the adjoining thickness T may be indicated by color, by setting the colors of the separators 308 to yellow, blue, or the like.

Namely, when the separators 308 are molded, the molding of the separators 308 by injection molding or the like is performed by using as a raw material pellets of a colored resin material toned in advance by mixing in plural-color pigments or a single-color pigment, or pellets of a natural-color resin material with plural-color pigment granules or single-color pigment granules mixed in. Thus, the separators 308 having different adjoining thicknesses T are set to different colors.

As a result, the assembly operator and the inspection operator are able to identify the difference in the adjoining thickness T of the separators 308 at a glance, thereby making it possible to further enhance the identifiability of the separators 308 having different adjoining thicknesses T.

As described above, in this embodiment, the adjoining thickness of the adjoining portion for separating the pair of roller contact surfaces of the separator interposed between adjacent ones of the rollers and adapted to retain the adjacent rollers is set to at least two kinds, and these separators having the different adjoining thicknesses are provided with identification marks so as to indicate the difference. Accordingly, it is possible to easily perform the setting of the circulation direction clearance in the assembly operation, making it possible to shorten the assembly time of the linear guide apparatus. At the same time, it is possible to enhance the visual identifiability of the separators having different adjoining thicknesses, thereby making it possible to attain efficiency in the assembly operation and inspection operation.

In addition, the identification mark is formed on both side surfaces of the separator as grooves which are recesses extending along the extension direction of the arm portion, and the separators having different adjoining thicknesses are identified by the number of these grooves. As a result, the release of the mold used in the injection molding of the separators is facilitated, making it possible to simplify the mold for molding the separators of different adjoining thicknesses. At the same time, as the identification marks are provided on both side surfaces, the directionality at the time of identification is eliminated, thereby allowing the identification marks to be easily identified.

Furthermore, as the separators having different adjoining thicknesses are set to different colors to indicate the difference, it is possible to further enhance the visual identifiability of the separators having different adjoining thicknesses, thereby making it possible to further attain efficiency in the assembly operation and inspection operation.

It should be noted that the invention is not limited to the above-described embodiments, and various changes and modifications are possible within the range which does not depart from the gist of the invention.

What is claimed is:

1. A separator for a linear guide apparatus comprising a guide rail, a slider, and a plurality of rollers which circulate while rolling in an endless circulation passage provided in the guide rail and the slider and having guide grooves extending in an arrangement direction of the rollers, the separator comprising:

a separator body interposed between adjacent ones of the rollers and comprising a pair of roller contact surfaces which respectively opposes to each other and contacts with an outer peripheral surface of the adjacent roller; and a pair of arm portions each jutting out from each ends of the separator body toward a direction of each of the adjacent rollers along with an end face of the adjacent roller, the pair of arm portions being guided by the guide grooves, wherein a surface of each of the arm portions opposing the guide groove of the endless circulation passage is formed such that an opposition distance with respect to the guide groove becomes wider from a fixed end side of the arm portion toward a free end thereof;

wherein a sectional shape of the separator is defined by a sectional plane extending parallel to a roller axis of the adjacent roller, wherein in the sectional plane, the arm portions of the separator are dimensioned to remain within a circle having a center that is aligned with a center of the separator and the diameter of the circle substantially corresponds to a maximum width of the separator.

2. The separator according to claim 1, wherein a maximum dimension of the separator in a projected shape in a direction normal to a plane including axes of the adjacent rollers is not more than the width of the guide groove.

3. The separator for the linear guide apparatus according to claim 2, wherein the maximum dimension in the projected shape of the separator is a maximum width of the separator in a widthwise direction of the guide groove.

4. The separator for the linear guide apparatus according to claim 1, wherein, on at least one of two opposing surfaces of the pair of arm portions of the separator, a guide surface, in which a distance between the two opposing surfaces becomes larger from the fixed end side of the arm portion toward the free end thereof, is formed.

5. The separator for a linear guide apparatus according to claim 1, wherein the separator is used for a linear guide apparatus comprising:

a guide rail comprising a rail raceway surface; and a slider disposed on the guide rail so as to be relatively movable and comprising:

a slider raceway surface for forming a roller raceway together with the rail raceway surface by opposing the rail raceway surface;

a pair of direction changing passages respectively continued from both ends of the rail raceway surface; and a roller return passage communicating with the pair of direction changing passages; and a plurality of rollers which circulate while rolling in an endless circulation passage formed by the rail raceway surface, the pair of direction changing passages, and the roller return passage.

6. The linear guide apparatus according to claim 5, wherein when a diameter of the roller is defined as Dw, a height of the separator is defined as H1, a height of the arm portion is defined as H2, and a groove width of the guide groove is defined as W, $(H_1-H_2)/2$ is set less than $(Dw-W)/2$.

7. The linear guide apparatus according to claim 5, wherein when the diameter of the roller is defined as Dw, and the thickness of the arm portion defined by a vertical direction of the slider raceway surface is defined as Tp, a thickness-diameter ratio Tp/Dw is set such that $$0.2 \leq Tp/Dw \leq 0.5.$$

8. The linear guide apparatus according to claim 5, wherein the separator has an adjoining portion for separating the pair of roller contact surfaces, at least two kinds of separators having the adjoining portions with mutually different thicknesses are used among a plurality of separators used in the linear guide apparatus, and the separators having the different adjoining thicknesses are respectively provided with identification marks indicating a difference thereof.

9. The linear guide apparatus according to claim 8, wherein the separators having the different adjoining thicknesses are respectively set to different colors to indicate the difference thereof.

10. A separator for a linear guide apparatus comprising a guide rail, a slider, and a plurality of rollers which circulate while rolling in an endless circulation passage provided in the guide rail and the slider and having guide grooves extending in an arrangement direction of the rollers, the separator comprising:

a separator body interposed between adjacent ones of the rollers and comprising a pair of roller contact surfaces which respectively opposes to each other and contacts with an outer peripheral surface of the adjacent roller; and a pair of arm portions each jutting out from each ends of the separator body toward a direction of each of the adjacent rollers along with an end face of the adjacent roller, the pair of arm portions being guided by the guide grooves, wherein a surface of each of the arm portions opposing the guide groove of the endless circulation passage is formed such that an opposition distance with respect to the guide groove becomes wider from a fixed end side of the arm portion toward a free end thereof;

wherein the separator is used for a linear guide apparatus comprising:

a guide rail comprising a rail raceway surface; and a slider disposed on the guide rail so as to be relatively movable and comprising:

a slider raceway surface for forming a roller raceway together with the rail raceway surface by opposing the rail raceway surface;

a pair of direction changing passages respectively continued from both ends of the rail raceway surface; and a roller return passage communicating with the pair of direction changing passages; and a plurality of rollers which circulate while rolling in an endless circulation passage formed by the rail raceway surface, the pair of direction changing passages, and the roller return passage;

wherein the separator has an adjoining portion for separating the pair of roller contact surfaces, at least two kinds of separators having the adjoining portions with mutually different thicknesses are used among a plurality of separators used in the linear guide apparatus, and the separators having the different adjoining thicknesses are respectively provided with identification marks indicating a difference thereof.

11. The linear guide apparatus according to claim 10, wherein the separators having the different adjoining thicknesses are respectively set to different colors to indicate the difference thereof.

* * * * *